United States Patent
Sinclair et al.

(10) Patent No.: US 7,668,953 B1
(45) Date of Patent: Feb. 23, 2010

(54) RULE-BASED NETWORK MANAGEMENT APPROACHES

(75) Inventors: Keith Sinclair, Santa Clara, CA (US);
Burjiz Pithawala, San Jose, CA (US);
Suresh Thirukazhukundram, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1066 days.

(21) Appl. No.: 10/714,158

(22) Filed: Nov. 13, 2003

(51) Int. Cl.
*G06F 15/173* (2006.01)
*G06F 11/00* (2006.01)

(52) U.S. Cl. .......................... 709/224; 714/4

(58) Field of Classification Search ................. 709/224
See application file for complete search history.

(56) References Cited

U.S. PATENT DOCUMENTS

| | | | |
|---|---|---|---|
| 4,873,517 A | 10/1989 | Baratz et al. | |
| 5,161,110 A | 11/1992 | Dorchak | |
| 5,202,985 A | 4/1993 | Goyal | |
| 5,528,516 A * | 6/1996 | Yemini et al. | 702/181 |
| 5,661,668 A * | 8/1997 | Yemini et al. | 702/186 |
| 5,687,290 A * | 11/1997 | Lewis | 706/45 |
| 5,751,914 A * | 5/1998 | Coley et al. | 706/47 |
| 5,758,154 A | 5/1998 | Qureshi | |
| 6,006,016 A * | 12/1999 | Faigon et al. | 714/48 |
| 6,014,612 A | 1/2000 | Larson et al. | |
| 6,040,834 A | 3/2000 | Jain et al. | |
| 6,047,279 A | 4/2000 | Barrack et al. | |
| 6,249,755 B1 * | 6/2001 | Yemini et al. | 702/183 |
| 6,317,788 B1 * | 11/2001 | Richardson | 709/224 |
| 6,336,139 B1 * | 1/2002 | Feridun et al. | 709/224 |
| 6,351,771 B1 | 2/2002 | Craddock et al. | |
| 6,360,255 B1 | 3/2002 | McCormack et al. | |
| 6,598,183 B1 | 7/2003 | Grieco et al. | |
| 6,618,692 B2 | 9/2003 | Takahashi et al. | |
| 6,633,833 B2 | 10/2003 | Sharma et al. | |
| 6,662,017 B2 | 12/2003 | McCann et al. | |
| 6,662,192 B1 | 12/2003 | Rebane | |
| 6,668,281 B1 | 12/2003 | Ayyadurai | |
| 6,690,788 B1 | 2/2004 | Bauer et al. | |
| 6,701,324 B1 | 3/2004 | Cochran et al. | |
| 6,718,337 B1 | 4/2004 | Klein et al. | |
| 6,751,661 B1 | 6/2004 | Geddes | |
| 6,754,707 B2 | 6/2004 | Richards et al. | |
| 6,766,368 B1 * | 7/2004 | Jakobson et al. | 709/224 |
| 6,772,097 B1 | 8/2004 | Kromenakar et al. | |
| 6,772,178 B2 | 8/2004 | Mandal et al. | |
| 6,788,315 B1 | 9/2004 | Kekic et al. | |
| 6,792,456 B1 * | 9/2004 | Hellerstein et al. | 709/224 |
| 6,952,659 B2 | 10/2005 | King et al. | |
| 6,996,670 B2 * | 2/2006 | Delaire et al. | 711/114 |

(Continued)

OTHER PUBLICATIONS

Microsoft, Microsoft Computer Dictionary, 2002, Microsoft Press, 5th, p. 41.*

(Continued)

*Primary Examiner*—Aaron Strange
(74) *Attorney, Agent, or Firm*—Hickman Palermo Truong & Becker LLP

(57) ABSTRACT

A method is disclosed for detecting symptoms in a network infrastructure, combining one or more symptoms into a problem, then optionally applying detailed diagnosis to the network elements experiencing the problems, ultimately providing detailed problem determination.

8 Claims, 8 Drawing Sheets

U.S. PATENT DOCUMENTS

| | | | |
|---|---|---|---|
| 7,039,702 B1 * | 5/2006 | Churchyard | 709/224 |
| 7,058,860 B2 * | 6/2006 | Miller et al. | 714/47 |
| 7,065,566 B2 * | 6/2006 | Menard et al. | 709/223 |
| 7,080,141 B1 * | 7/2006 | Baekelmans et al. | 709/224 |
| 7,093,010 B2 * | 8/2006 | Ostrup et al. | 709/223 |
| 7,328,260 B1 * | 2/2008 | Muthiyan et al. | 709/224 |
| 7,379,999 B1 * | 5/2008 | Zhou et al. | 709/224 |
| 7,412,701 B1 | 8/2008 | Mitra | |
| 2002/0059046 A1 | 5/2002 | Mifune et al. | |
| 2002/0073195 A1 * | 6/2002 | Hellerstein et al. | 709/224 |
| 2002/0091818 A1 * | 7/2002 | Cascio et al. | 709/224 |
| 2002/0173997 A1 * | 11/2002 | Menard et al. | 705/7 |
| 2003/0009465 A1 | 1/2003 | Brown et al. | |
| 2003/0091165 A1 | 5/2003 | Bearden et al. | |
| 2003/0154267 A1 | 8/2003 | Camacho et al. | |
| 2003/0154404 A1 | 8/2003 | Beadles et al. | |
| 2003/0179227 A1 | 9/2003 | Ahmad et al. | |
| 2003/0204370 A1 * | 10/2003 | Yemini et al. | 702/183 |
| 2004/0006688 A1 | 1/2004 | Pike et al. | |
| 2004/0122908 A1 | 6/2004 | Konopka et al. | |
| 2004/0123091 A1 | 6/2004 | Das | |
| 2004/0181670 A1 | 9/2004 | Thune et al. | |
| 2005/0114494 A1 * | 5/2005 | Beck et al. | 709/224 |
| 2006/0116841 A1 * | 6/2006 | Baekelmans et al. | 702/121 |

OTHER PUBLICATIONS

Marques, Todd E., A Symptom-Driven Expert System for Isolating and Correcting Network Faults, Mar. 1988, IEEE Communications Magazine, vol. 26, No. 3, p. 6-13.*

Microsoft, Microsoft Computer Dictionary, 2002, Microsoft Press, 5th, p. 281.*

Dennis Drogseth, "The New Management Landscape," *Packet, Cisco Systems Users Magazine*, Third Quarter 2002, pp. 29-60.

IBM, Cisco Systems, Inc., "Adaptive Services Framework," Version 1.00, Oct. 14, 2003, pp. 1-66.

* cited by examiner

RULE-BASED NETWORK MANAGEMENT APPROACHES

FIELD OF THE INVENTION

The present invention generally relates to management of computer networks. The invention relates more specifically to rule-based network management approaches.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks that use routers, switches and other network elements are commonly managed using network management software systems. Examples of network management systems include Resource Management Essentials from Cisco Systems, Inc., San Jose, Calif.; HP OpenView from Hewlett-Packard Company, Palo Alto, Calif., and others. Such network management systems are commonly used to support detection of network events, including device faults, and to apply corrective instructions or configuration commands to network elements.

For a network owner to use such network management software systems effectively for fault management, the network owner must know how to identify events that may represent symptoms of problems, how to determine whether symptoms actually represent problems, how to diagnose the problems, how to select corrective action, and how to apply or perform the corrective action. In current approaches, these steps are performed manually, and are supported by network-specific knowledge that is mentally retained by individuals such as network administrators who operate the network management systems.

However, this approach has several serious drawbacks. For example, the knowledge described above is not captured in an organized manner to facilitate re-use with respect to new problems, or to provide continuity if a responsible individual leaves the organization. Further, the approach is manual and therefore potentially slow to respond to serious network events. In addition, the knowledge involved in the prior approaches may involve a large amount of information that is difficult for any one person to absorb and manage. Although the network administrators may apply mentally retained rules in analyzing symptoms, identifying problems and selecting corrective action, the rules are not represented by information that can be processed by machines in an automated manner.

Based on the foregoing, there is a clear need for improved network management approaches that can overcome the stated drawbacks of current approaches. There is a particular need to a way to capture network rules in a flexible way, distribute the rules to network management applications, and distribute the rules to other stakeholders associated with the network. There is also a need for a way to implement automated correlation logic to solve network problems. There is a need for a way to identify network problems by analyzing relationships of symptoms and problems.

In past approaches, certain network management systems have provided proprietary languages for defining capture network rules. Typically, such systems have involved communication of knowledge from a device engineer to a software developer who creates the network management system. When new devices or features are introduced, these systems have required software patches to update their ability recognize new devices that are introduced into the network, which is undesirable and error-prone. Thus, there is a need for a way to allow for dynamically updating rules. Further, these systems typically have involved hard-coding rules or knowledge into the software instructions that make up the systems. There is a need for a way to capture network rules in a form that is closer to human-readable natural language.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
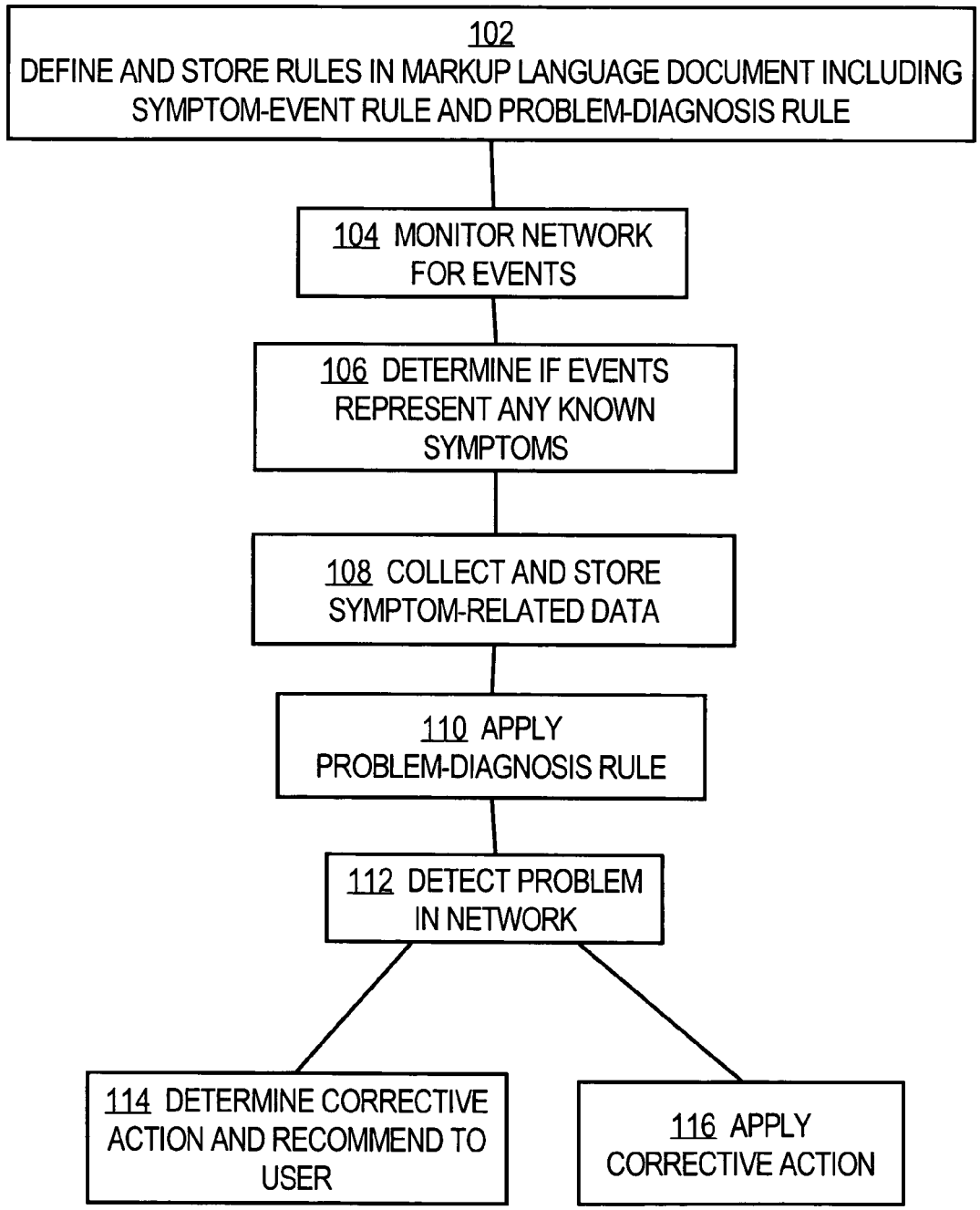
FIG. 1 is a flow diagram of a first embodiment of a method of rule-based network management.

Rule-based network management approaches area described, in the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | | |
|---|---|---|
| 1.0 | General Overview | |
| 2.0 | Rule-Based Network Management Approaches | |
| | 2.1 Functional Overview | |
| | 2.2 Rule-Based Document Data Flow | |
| | 2.3 Example System Structure | |
| |     2.3.1 Rule-Based Markup Language (RBML) Documents | |
| |     2.3.2 Rule Broker | |
| 3.0 | Implementation Mechanisms - Hardware Overview | |
| 4.0 | Extensions and Alternatives | |

1.0 GENERAL OVERVIEW

The needs identified in the foregoing Background, and other needs and objects that will become apparent from the following description, are achieved in the present invention, which comprises, in one aspect, a method for rule-based network management, the method comprising the computer-implemented steps of defining and storing a set of rules in one or more Rule-Based Markup Language ("RBML") documents, wherein the one or more RBML documents include one or more tags defining one or more rule elements. The set of rules includes a symptom-event rule that identifies as a symptom a particular event occurring within the network and a problem-diagnosis rule that defines a problem within the network as a correlation between one or more symptoms. The method further includes collecting and storing symptom-related data about one or more symptoms, wherein collecting and storing the symptom-related data includes monitoring the network for one or more network events identified in the symptom-event rule; and detecting a problem within the network, wherein detecting According to a feature, the method further comprises reviewing the set of rules to identify and resolve a conflict between two or more rules in the set. According to another feature, the method further comprises storing the one or more RBML documents in a rule repository, wherein the rule repository includes one or more directories containing RBML documents. In another feature, a RBML document storing the problem-diagnosis rule includes a problem-definition tag describing a problem; and a correlation tag identifying the correlation between one or more symptoms, wherein the one or more symptoms are defined in one or more symptom tags that include one or more pre-defined indicators associated with the one or more symptoms.

According to another feature, the step of detecting a problem within the network further comprises the steps of comparing the symptom-related data to the one or more pre-defined indicators associated with a particular symptom to determine whether the particular symptom exists in the symptom-related data; repeating the step of comparing the symptom-related data for all symptoms identified in the correlation tag of the RBML document storing the problem-diagnosis rule; and only if all symptoms identified in the correlation tag exist, determining that the problem identified in the problem-definition tag is detected.

According to yet another feature, an RBML document storing the symptom-event rule includes an event tag identifying the particular event occurring on the network and a symptom tag identifying a symptom as a generalized abstraction of the particular event. In another feature, the RBML document storing the symptom-event rule further includes a profile tag identifying a particular network device and a command tag identifying a data-collection command, wherein the data-collection command, when executed on the particular network device, returns symptom-related data associated with the particular network device. In still another feature, the set of rules further includes a problem-correction rule defining one or more corrective actions capable of correcting the problem within the network, and the method further comprises the step of recommending to a user one or more corrective actions defined in a RBML document storing the problem-correction rule.

According to another feature, the method further comprises applying to a network device, without user intervention, one or more corrective actions defined in the problem-correction rule. According to yet another feature, the network is a first network in a plurality of networks, and the method further comprises the steps of receiving a request from a user to employ a particular rule in managing a second network, separate from the first network, and distributing to a device on the second network the one or more RBML documents storing the particular rule.

In another aspect, the invention provides a method for defining a Rule-Based Markup Language ("RBML") to describe a set of rules for managing a network, the method comprising the computer-implemented steps of creating one or more RBML documents for storing the set of rules, wherein the one or more RBML documents include one or more tags defining one or more rule elements. The RBML document storing a symptom-event rule from the set of rules includes an event tag identifying a particular event occurring on the network and a symptom tag identifying a symptom as a generalized abstraction of the particular event. An RBML document storing a problem-diagnosis rule from the set of rules includes a problem-definition tag describing a problem and a correlation tag identifying a correlation between one or more symptoms, wherein the one or more symptoms are defined in one or more symptom tags that include one or more pre-defined indicators associated with the one or more symptoms. The method further includes generating, from information stored in one or more tags of the one or more RBML documents, one or more sequences of instructions, which instructions, when executed by one or more processors, cause the one or more processors to carry out the steps of collecting and storing symptom-related data about one or more symptoms, wherein collecting and storing the symptom-related data includes monitoring the network for one or more network events identified in the symptom-event rule; and detecting a problem within the network, wherein detecting the problem includes applying the problem-diagnosis rule to the symptom-related data.

In other aspects, the invention encompasses a computer apparatus and a computer-readable medium configured to carry out the foregoing steps.

2.0 RULE-BASED NETWORK MANAGEMENT APPROACHES

2.1 Functional Overview

A functional overview of rule-based network management approaches is now provided. In one approach, rule-based network management is based in part on creating and using electronic documents that conform to a rule-based markup language (RBML). RBML documents provide a way to capture abstract network management rules in a flexible manner. RBML documents also facilitate distribution of such rules to different network management applications, and to various stakeholders in the network management process, such as network equipment vendors, their customers and partners. Software elements of a rule-based network management system that uses RBML documents can implement correlation logic to associate events with symptoms, symptoms with problems, and problems with corrective actions. Thus, such software elements can capture network rules in RBML documents, distribute the rules in RBML format, identify problems with network equipment through a symptom-problem relationship, distribute and rules.

In this context, "symptom" refers to an indication of a problem, which may result from an event occurring or being true (e.g., a syslog link is down), or pertinent data exceeding a threshold. A "problem" is a certain set of symptoms that occur a prescribed number of times in a specified time interval. Further, the term "network management system (NMS)" refers broadly to any system consisting of one or more agents or other components in network devices, one or more network elements, servers or appliances, and/or one or more applications or other infrastructure hosted in a network operations center (NOC). The approaches described herein apply to the NMS as a whole and also are equally applicable to elements of an NMS residing within a network device.

In general, suitable formats for rule-based electronic documents would support an expression of a rule that approximates human-readable natural language. In one approach, network engineers write rules in the documents and network operators interact with the completed documents. Knowledge of the network engineers is embodied in the rules.

In one specific approach, RBML documents conform to a markup language based on eXtensible Markup Language (XML) that defines a structure for writing rules for network management. RBML also defines a structure for rules describing a network infrastructure and how to identify elements of a network infrastructure. RBML also defines a way to describe rules that represent "best practices" in network management and rules for identifying problems in a network. RBML documents can describe the symptoms or "signatures" of network problems. A network management system can implement the rules defined in RBML documents directly, or convert the rules into a native representation within the network management system.

A network management system may comprise many RBML documents that define one or more problems. Different network management systems may comprise different sets of RBML documents according to the preferences of network administrators. For example, one entity may use Border Gateway Protocol (BGP) in its routing infrastructure and therefore may elect to create or install RBML documents that define BGP problems; another entity that does not use BGP may elect not to install RBML documents relating to BGP. In one approach, a network management system can add rules defined by RBML documents at any time during operation by parsing new RBML documents and reconfiguring its operations accordingly.

RBML documents are reusable in different systems. For example, RBML documents that define device rules may be used in multiple different applications such as discovery, inventory, network profiling, etc. RBML documents that define data collection rules may be used by auditing applications, diagnosis applications, etc.

In various embodiments, RBML is implemented directly by a network management system, or is converted to another language that is known to the network management system, such as the SMARTS InCharge model language, NetCool scripting language, etc.

FIG. 1 is a flow diagram of a first embodiment of a method of rule-based network management. In block 102, one or more rules are defined and stored in a markup language document. The markup language document defines at least one symptom-event rule and one problem-diagnosis rule. The structure of an example markup language document is described further herein in section 2.4.

In block 104, a network is monitored for events. For example, a software process listens on an event bus for events that are published by network devices on a specified topic that represents a fault, problem, or other kind of event. Alternatively, block 104 may involve having the process periodically poll network devices, directly or indirectly through a collection process, to collect values for network objects and compare the collected values to specified thresholds. If a specified threshold is crossed, then further action is taken.

In block 106, a determination is made about whether the events represent any known symptoms of problems. The determination of block 106 may be performed by evaluating the rules expressed in the markup language document based on the event information or collected information.

In block 108, symptom-related data is collected and stored. Block 108 may involve issuing new collection instructions or events into the network to obtain further information from affected network devices about symptoms that have been identified in block 106. In block 110, the problem-diagnosis rule is applied to the symptom information and the further information that has been collected for a symptom. In block 112, a problem is detected in the network based on applying the problem-diagnosis rule.

Optionally, in block 114, a corrective action for the problem is determined and recommended to a user. For example, block 114 may involve determining a corrective action based on a knowledge base that correlates problems to corrective actions, and proposing the corrective action to a network administrator through the user interface of a network management application. Additionally or alternatively, a corrective action is automatically applied to one or more devices in the network at block 116. Thus, block 116 may involve applying a corrective action without first advising a user or requesting confirmation from the user. In this context, corrective actions may include creating a log entry, sending an email message, issuing a page, generating an alert, initiating a case in a trouble ticketing system or the equivalent, performing a configuration command or operation, executing a script, or recommending any of the foregoing actions.

2.2 Rule-Based Document Data Flow

Figure 2A:
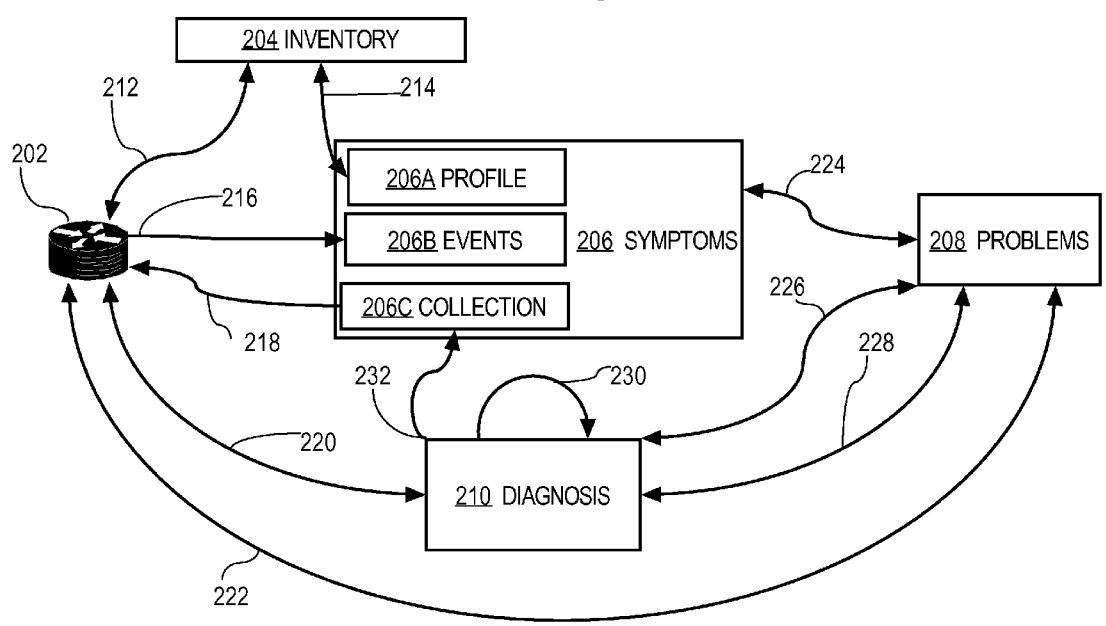
FIG. 2A is a high-level block diagram that illustrates relationships among rule-based network management documents.

FIG. 2A is a high-level block diagram that illustrates relationships among rule-based network management documents in one implementation. In the example of FIG. 2A, a network comprises one or more network devices 202 and a rule-based network management system includes an inventory document 204, symptoms document 206, problems document 208, and diagnosis document 210. Thus, there may be different kinds of RBML documents for different uses. In an alternative approach, the content of inventory document 204, symptoms document 206, problems document 208, and diagnosis document 210 may be consolidated in one RBML document. Further, in a practical system there may any number of instances of inventory document 204, symptoms document 206, problems document 208, and diagnosis document 210 that define different devices, symptoms, problems, and diagnoses. For clarity, FIG. 2A illustrates one instance of each. An example internal structure of RBML documents is described below with reference to FIG. 4.

Inventory document 204 defines what network devices are present in a network and how to communicate them. For example, an inventory document 204 defines the meaning of SNMP object identifiers (OIDs), devices and cards, what features and technology are in the network, or what internal processes relate to the inventory elements. For example, an inventory document 204 can associate a defect tracking process with inventory elements. Thus, inventory document 204 provides the ability to interpret network information that is collected from the network, and defines relationships between inventory and configuration elements using a common vocabulary that allows the definition of profile elements.

Symptoms document 206 defines symptoms of potential network problems. The symptoms document 206 provides the ability to identify interesting symptoms, ignore others, and abstract the interesting symptoms so that a problem document can refer to them symbolically in a correlation definition.

The problems document 208 may include a corrective action block that specifies an action to correct the associated problem. In one embodiment, an action may comprise a CLI command, SNMP action, etc.; thus, the corrective action block specifies a specific, actual corrective action that can be taken to correct the problem, rather than a recommendation of an action. Alternatively, the corrective action block can specify operations for presenting further information to an engineer. The problems document 208 associates symptoms into definable problems so that combinations of events and collections ultimately become associated with known issues in the network.

The diagnosis document 210 defines further commands or operations that enable a network management system to verify that symptoms or problems actually represent a particular issue. Such diagnosis may be required to verify a problem before reporting it to another system or individual. For example, a diagnosis document 210 defines further data collection operations and ways to analyze the collected information to verify that an issue exists. Thus, the diagnosis document 210 defines how to perform an in-depth analysis of collected data and, if required, can initiate further data collection. Diagnosis is implemented as an iterative loop that continues to execute until the criteria no longer apply.

A functional description of FIG. 2A is now provided. As a high-level summary, a process for problem analysis may proceed as follows. Information is collected from various sources. Indicators in the collected data are symptoms of a problem. A set of symptoms indicates a problem correlation. A problem has a description and a recommended solution. A problem triggers a diagnosis, which will perform additional data collection and analysis. The diagnosis returns a confirmation to a problem. A corrective action is defined that includes specific actions to be taken. Actions are triggered from the problem and identify what the problem engine should do.

Referring again to FIG. 2A, path 212 indicates that inventory document 204 tracks network device 202 and any other devices that may participate in a managed network. Path 214 indicates that profile block 206A is based upon the contents of inventory document 204. Events generated or published by device 202 are processed using symptoms document 206 as indicated by path 216, and the symptoms document may specify collection operations that are performed on the device as indicated by path 218.

Path 224 represents processing symptoms defined in symptoms document 206 to determine if the symptoms represent problems as defined in problems document 208. Path 226 and path 220 represent initiating diagnostic operations through review of diagnosis document 210. Such diagnosis could result in initiating further data collection operations, as indicated by path 232. Iterative diagnosis may be performed, as represented by path 230. Path 226 represents a final diagnostic report or a report of additional symptoms passed back to elements that process problems document 208. Path 222 represents applying corrective action to device 202. Corrective actions may include generating a log entry, generating a report, generating a suggested corrective action, performing a command or SNMP operation on a device, etc.

As an example of using the elements of FIG. 2A, in a network that contains devices from Cisco Systems, Inc., symptoms document 206 may define the message "SYS-5-RELOAD" from a router as a symptom tagged as "device reload symptom." Problems document 208 may associate the occurrence of the "device reload symptom" once as an indication of a device reload problem. Collection block 206C of symptoms document 206 may define collection operations as the Cisco IOS® CLI commands "sh stack" and "sh tech support". The diagnosis document 210 may define diagnostic operations to check for bus error. The corrective action block of problems document 208 could specify creating a log entry.

2.3 Example System Structure and Function

Figure 3:
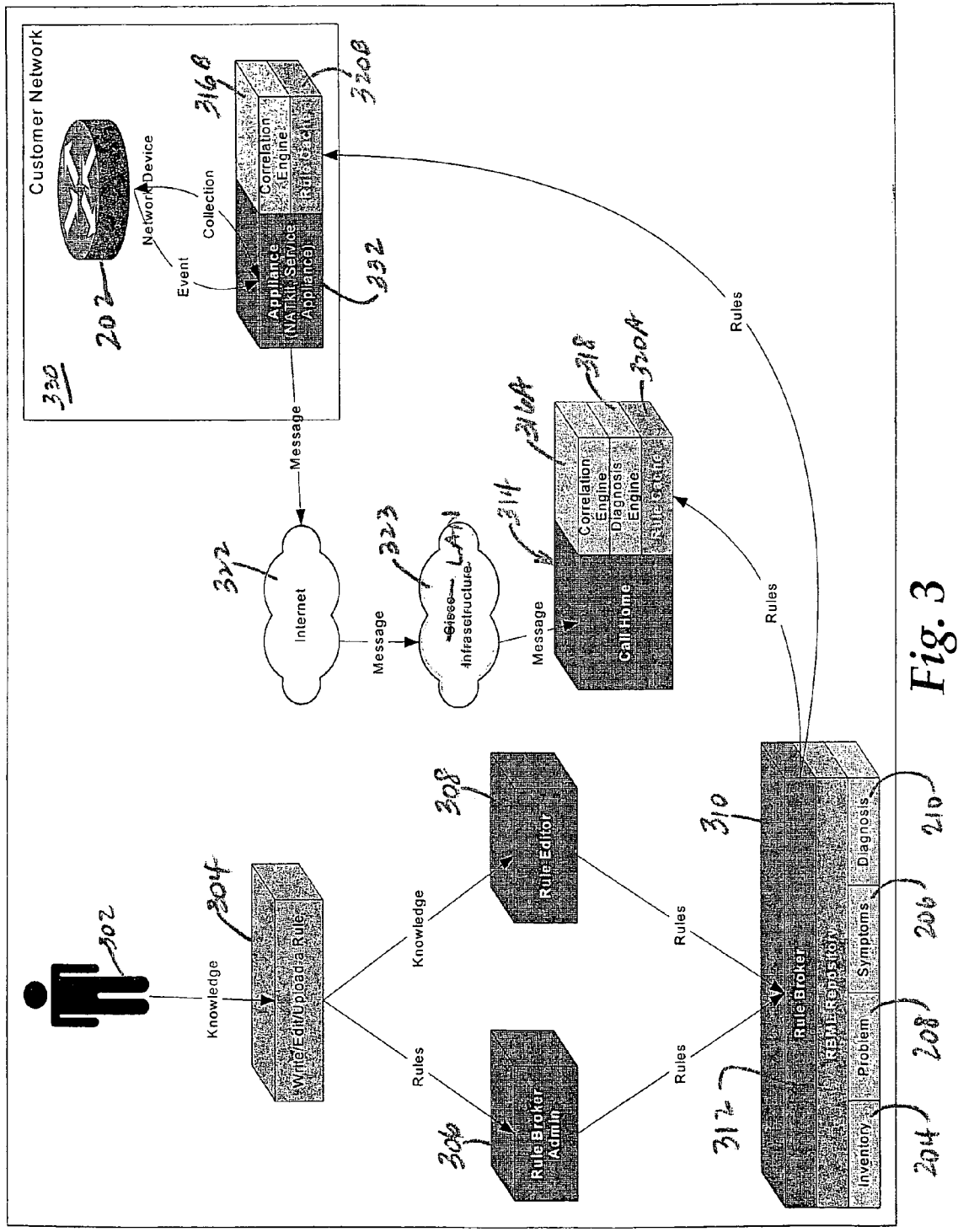
FIG. 3 is a high-level block diagram showing data flow among elements of a first embodiment of a rule-based network management system.

FIG. 3 is a high-level block diagram showing data flow among elements of a first embodiment of a rule-based network management system. The architecture of FIG. 3 provides separation of major system components consisting of the RBML language, engines for processing RBML documents, distribution mechanisms, and tools supporting other workflow aspects. Elements of FIG. 3 may be implemented in the Perl scripting language, for example.

In one embodiment, distribution of rules is provided through a rule broker. The rule broker functions to manage rules, get rules to the right applications, provide notification of new rules, enforce security for rules, determine which services are entitled to use rules, etc. A rule editor supports higher-level workflow. The rule editor provides a way to capture new rule requirements and ideas, prioritize and control rule development, facilitate creation of rules using a graphical user interface, ensure that particular required steps are followed in order, and formalize review and testing.

Referring again to FIG. 3, a knowledge worker 302 provides knowledge that is used to write, edit or upload a rule, as indicated by block 304. Completed rules are provided to a rule broker administration application 306 for pre-processing and communication to RBML broker 310. Alternatively, knowledge of worker 302 may be applied to a rule editor 308 to result in creating rules that are communicated to the RBML broker 310.

RBML broker 310 comprises a RBML repository 312 and logic for communicating rules to an application 314 or appliance 332. RBML repository stores RBML documents defining inventory, problems, symptoms, and diagnostic actions, such as inventory document 204, problem document 208, symptoms document 206, and diagnosis document 210 of FIG. 2A.

As an example, FIG. 3 illustrates a Call Home application 314 that interoperates with a correlation engine 316A, diagnosis engine 318, and rule cache 320A. The Call Home application 314 uses RBML documents to diagnose problems with network device 202 or other devices; however, the Call Home application is only one example, and many other kinds of applications may use RBML documents for different purposes. All such applications interoperate with a correlation engine 316A, diagnosis engine 318, and rule cache 320A.

In the example of FIG. 3, rule cache 320A provides local storage of rules obtained from RBML broker 310 that pertain to the Call Home application 314 or devices that it manages. The correlation engine 316A correlates events and collected data with symptoms, and correlates symptoms with problems, based on the metadata about symptoms and problems in rules obtained from RBML broker 310. The diagnosis engine 318 initiates diagnostic operations on managed devices to assist in verifying that problems exist.

Messages generated and received by Call Home application 314 may traverse one or more public networks, such as a local area network 323 and Internet 322 in the example of FIG. 3, as part of communication with appliance 332 that is located within a customer network 330 that contains one or more devices 202. In this context, "customer" is used broadly to refer to any party that is affiliated with a party that owns or operates RBML broker 310 and Call Home application 314. For example, a first party that uses customer network 330 may be a customer of an Internet service provider, managed service provider or network equipment vendor that owns and operates Call Home application 314. In other approaches, there may be no such vendor-customer relationship and such parties may be one and the same.

Appliance 332 broadly represents any network element that provides a service to, or interacts with, network device 202. Such interaction may involve receiving events and performing collection operations. For example, appliance 332 may be a network management system, the NATkit or Service Appliance of Cisco Systems, Inc., etc. Appliance 332 interoperates with a correlation engine 316B and a rule cache 320B, which perform functions for the appliance that are similar to the functions described above with respect to correlation engine 316A and rule cache 320A.

Figure 2B:
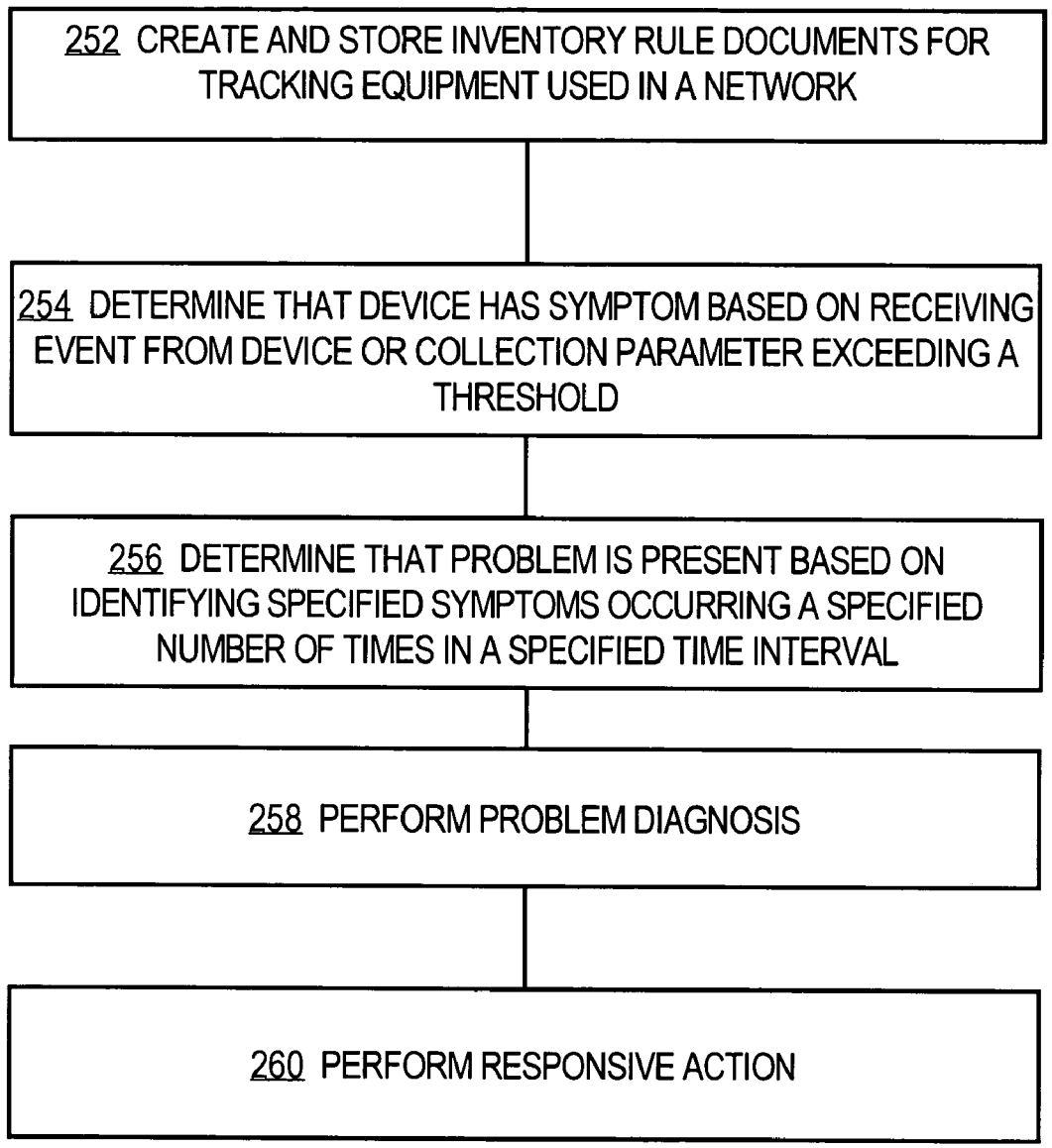
FIG. 2B is a flow diagram of a second embodiment of a method of rule-based network management that may be used with the rule-based network management documents of FIG. 2A.

FIG. 2B is a flow diagram of a second embodiment of a method of rule-based network management. For purposes of illustrating a clear example, FIG. 2B is described below with reference to the rule-based network management documents of FIG. 2A and the system of FIG. 3. However, the process of FIG. 2B is broadly applicable to many other systems and network contexts.

In block 252, one or more inventory rule documents for tracking equipment used in a network are created and stored. For example, knowledge worker 302 creates one or more inventory documents 204 and stores them using RBML broker 310.

In block 254, a determination is made that a device has a symptom based on receiving an event from the device or based on determining that a collection parameter exceeds a specified threshold. For example, assume that RBML broker 310 processes RBML documents in the RBML repository to result in creating and storing rules in the repository. The RBML broker 310 distributes rules applicable to Call Home application 314 to rule cache 320A. Device 202 then experiences a fault and communicates an event to appliance 332. The appliance 332 then sends a message through Internet 322 and LAN 323 to Call Home application 314. The correlation engine 316A correlates the event to a symptom that is represented by a rule in rule cache 320A.

In block 256, a determination is made that a problem is present, based on identifying specified symptoms occurring a specified number of times in a specified time interval. For example, correlation engine 316A determines that a set of specified symptoms as defined in rules of rule cache 320A have occurred over a period of time specified in the rules. In response, correlation engine 316A determines that the symptoms represent a known problem.

In block 258, problem diagnosis is performed. For example, diagnosis engine 318 initiates diagnostic operations for device 202 by issuing instructions to appliance 332 to perform specified diagnostic commands or collection operations. Diagnosis engine 318 receives results of the diagnostic commands or collection operations and, in response, initiates additional diagnostic operations or sends the correlation engine 316A information representing a final diagnosis of the problem.

In block 260, a corrective action is performed. Any of the corrective actions previously described may be invoked at block 260.

Figure 5:
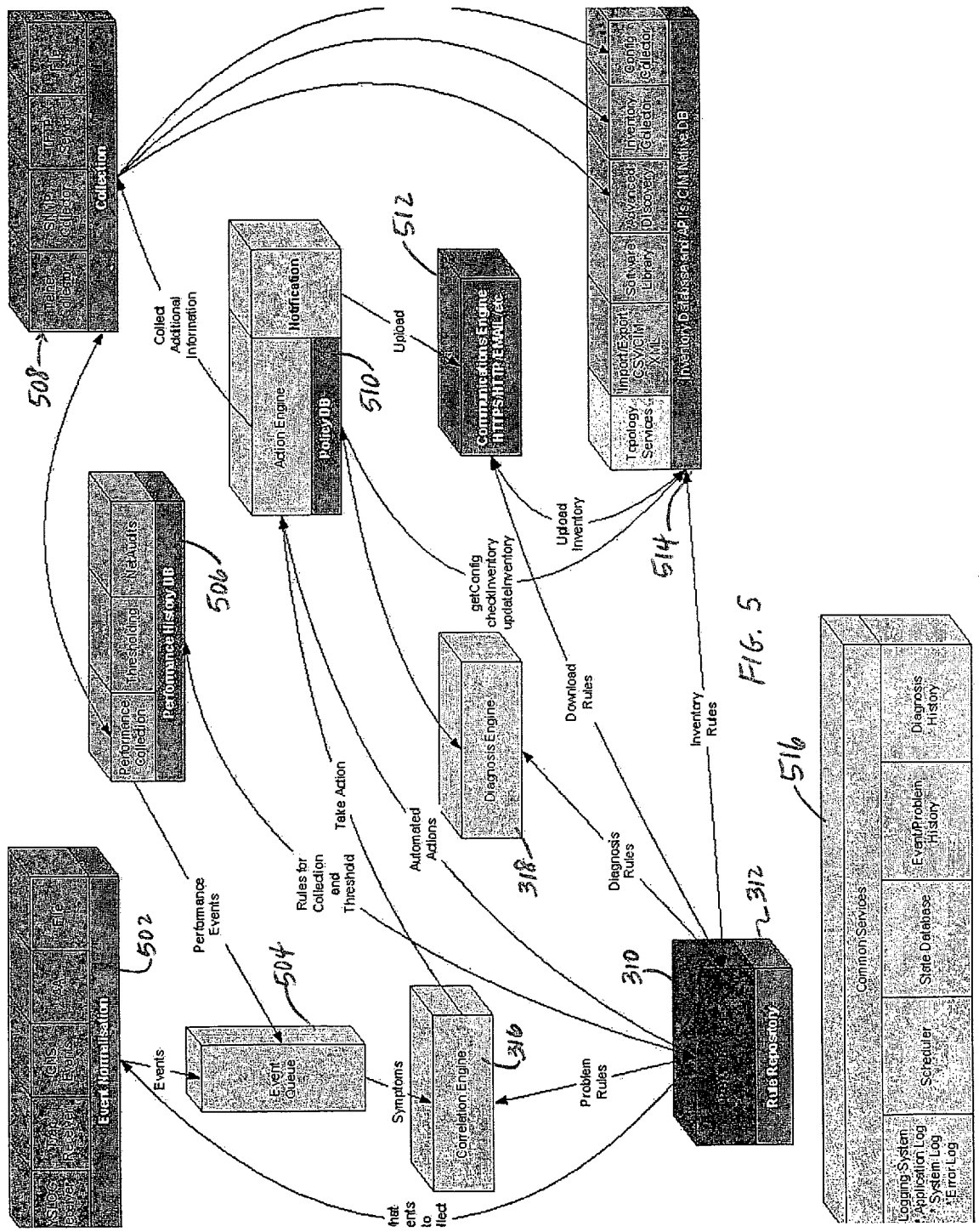
FIG. 5 is a block diagram of a second embodiment of a rule-based network management system.

FIG. 5 is a block diagram of a second embodiment of a rule-based network management system. FIG. 5 illustrates an integrated embodiment of a network management system that may be used for any of many particular applications. In contrast, FIG. 3 illustrates a system for a particular task as represented by Call Home application 314.

In the example of FIG. 5, RBML broker 310 manages rules stored in rule repository 312. The rule repository 312 may comprise a relational database, file system, or other storage mechanism. RBML broker 310 communicates rules defining what events to collect to an event normalization layer 502 that interoperates with and normalizes event data received from one or more event systems such as a syslog receiver, trap receiver, etc. Events generated by event normalization layer 502 arrive in an event queue 504 that is communicatively coupled to correlation engine 316. The correlation engine 316 identifies symptoms based on events received from the event queue 504 and based on problem rules received from RBML broker 310.

RBML broker 310 further provides diagnosis rules to diagnosis engine 318, which is communicatively coupled to a policy database 510 for purposes of generating collection actions or inventory actions. The structure and function of diagnosis engine 318 is described in detail in a separate section below.

A performance history database 506 receives rules for data collection and threshold evaluation from RBML broker 310. Performance history database 506 is associated with a performance collection service, thresholding service, and auditing service. The performance collection service may generate performance events for placement in event queue 504 for communication to devices, resulting in collection of data values from the devices. The performance collection service is supported by a collection engine 508 that may comprise any of a plurality of specific collection services that use particular collection technologies, such as a telnet collector, SNMP collector, TFTP collector, file collector, etc. The thresholding service determines whether a particular data value collected from a device has crossed a specified threshold value. Collection engine 508 may cooperate with inventory database 514 and its associated services, which are described further below, to perform requested collection operations. For example, if collection engine 508 does not have a method for collecting particular information from a particular device stored locally, the collection engine may request instructions from inventory database 514 and its associated services regarding how to collect the information.

Policy database 510 is further associated with an action that can initiate data collection or other actions in cooperation with collection engine 508, and a notification engine that can generate notification messages in any of a variety of formats and upload the messages to a communications engine 512 for communication to specific devices. The communications engine 512 receives downloading rules from RBML broker 310 that control how communications engine downloads information from devices. For example, particular downloading rules may specify that particular devices or services require information to be downloaded using HTTPS, HTTP, e-mail, or other technologies.

An inventory database 514 receives inventory rules from RBML broker 310 and is associated with APIs, topology services, import/export utilities, libraries, and similar services for performing inventory collection and related functions with respect to particular devices. Policy database 510 can retrieve a device configuration, check device inventory, and update device inventory based on actions performed by the associated action engine through communication with inventory database 514. The action engine further may receive instructions to perform automated actions from RBML broker 310 based on rules managed by the RBML broker.

The foregoing elements may be supported by common services 516 such as a logging systems, scheduler, state database, history records, etc.

2.3.1 Rule-Based Markup Language (RBML) Documents

Figure 4:
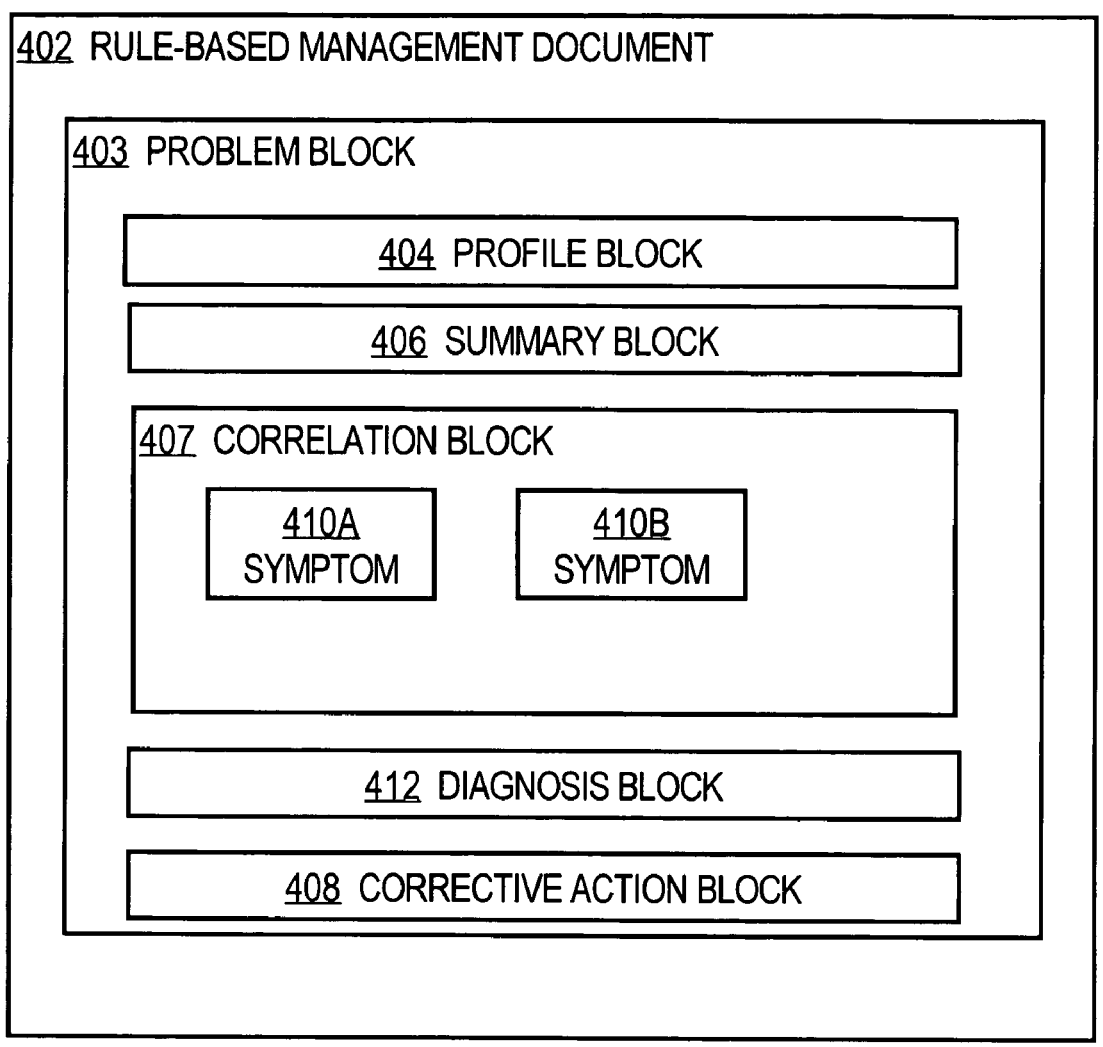
FIG. 4 is a block diagram of a rule document.

FIG. 4 is a block diagram of one embodiment of a rule document. In other embodiments, other formats may be used for rule documents. In general, a rule-based management document 402 comprises one or more problem blocks 403. Each problem block comprises a profile block 404, summary block 406, correlation block 407, diagnosis block 412, and corrective action block 408. The correlation block 407 specifies one or more symptoms in symptom block 410A, 410B.

Referring again to FIG. 2A, each of the illustrated RBML documents may comprise a profile block, summary block, corrective action block, and collection or match block. For clarity, such blocks are illustrated only with respect to symptoms document 206, which comprises a profile block 206A, events block 206B, and collection block 206C. The profile block 206A identifies profile elements that the rule represented in the symptoms document 206 will match. In general, a profile block defines the network profile elements to which a rule applies. The rule should be applied only to devices and device information that meet the profile elements. Types of elements from the profile include technology, operating system, platform name, versions, interfaces, etc. The profile elements are separately defined in the inventory document 204 or in separate technology and feature name documents. Thus, the profile block 206A specifies devices that are potentially subject to the symptoms represented in symptoms document 206, to facilitate use of the symptoms document with the correct devices. Use of a profile block 206A enables scaling the application of a rule to very large networks.

Events block 206B defines which events published by a target device may constitute a recognized symptom. Events may include syslog elements, SNMP traps, etc. Collection block 206C defines collection commands that may be performed to collect network device data that may represent symptoms. For example, collection block 206C may define command-line interface (CLI) commands, SNMP GET requests, TL1 operations, etc.

Any of the RBML documents may further include a summary block 406 that includes document control information, recommendations and descriptions, and/or metadata defining what services or systems are entitled to use or execute a rule. The summary block 406 serves as a documentation portion of rules. In the summary block 406, child elements that capture knowledge related to the implementation of a rule are defined. Document control elements such as author, reviewer, creation date and review date are also included to capture related information.

As described above for the problems document 208, the corrective action block defines the actions that can and should be taken to correct a problem that has been determined to exist. Alternatively, the corrective action block identifies corrective actions that are applied automatically to fix identified problems. Not all rules have associated corrective actions.

Optionally, a match block provides the ability to apply pattern matching to data being analyzed. The Match element is important to RBML in that it provides a very high level of flexibility and power to the language. Match statements are regular expressions that are applied to raw data to either parse the data or to make a true or false determination about it.

Further, different RBML documents may be used for other purposes. For example, a best practices document may specify agreed-upon best practices for network management, such as particular preferred router configurations or switch configurations, rules for good network design or topology, etc.

In one embodiment, RBML rules are created in documents using XML. RBML documents may be created using a text editor, XML editor, or rule editor 308 (FIG. 3). Data entry templates are also used and written using such editors. Rules are uploaded to RBML broker 310, validated, and tested.

Using rule editor 308, a user interface (UI) reads a Document Type Definition (DTD) or XML Schema (XSD) for RBML and provides a drill-down capability to create an RBML rule. The RBML editor can add child nodes and automatically generate web pages for data input for each rule. As a result, new functionality can be added and other changes made by expanding the RBML DTD or XSL rather than rewriting the interface. In addition, the RBML editor can use a Document Object Model (DOM) to create a document in memory and then write the document when it is complete.

As a markup language that uses XML, RBML is defined by a set of rules that specify the elements and attributes that are allowed or required in a complying document. In one embodiment, RBML implements elements to define content and implements attributes to alter the meaning of an element or define options for an element. Elements, attributes, or both are used to define rules in RBML. An example of an element is:

<person>
<first_name>Keith</first_name>
<last_name>Sinclair</last_name>
</person>

An example showing attributes is:
<person first_name="Keith" last_name="Sinclair"></person>

Table 1 presents an example of an Enhanced Interior Gateway Routing Protocol (EIGRP) Neighbor Flap problem rule.

TABLE 1

EIGRP NEIGHBOR FLAP PROBLEM RULE

```
<?xml version="1.0" encoding="UTF-8" standalone="no"?>
<rbml>
   <problem>
      <name>EIGRP_Neighbor_Flap</name>
      <title>EIGRP Neighbor Flap</title>
      <active>true</active>
      <profile>
         <technology_name>EIGRP</technology_name>
         <scope>Neighbor</scope>
         <os>IOS</os>
      </profile>
      <summary>
         <author>Keith Sinclair ksinclai@cisco.com</author>
         <creation_date>14 August 2001</creation_date>
         <review_date>14 August 2001</review_date>
         <age>3 months</age>
         <apply>Constant</apply>
         <description>The EIGRP neighbor is going up and down.
This can cause general network instability.</description>
         <recommendation>Determine the cause of the neighbor
flapping. </recommendation>
         <link
url="http://www.cisco.com/warp/public/103/">IGRP/EIGRP
Technical Tips</link>
      </summary>
      <correlation>
         <requires>any</requires>
         <symptom>
            <name>EIGRP_Neighbor_Down</name>
            <type>event</type>
            <threshold>4</threshold>
            <seconds>900</seconds>
         </symptom>
         <symptom>
            <name >EIGRP_Neighbor_Up</name>
            <type>event</type>
            <threshold>4</threshold>
            <seconds>900</seconds>
```

TABLE 1-continued

EIGRP NEIGHBOR FLAP PROBLEM RULE

```
            </symptom>
        </correlation>
        <action>
            <log>%date %problem node=%node neighbor=%neighbor
count=%count threshold=%threshold dampen=%dampen</log>
        </action>
    </problem>
</rbml>
```

In another embodiment, rule-based management document 402 conforms to a rule-based markup language. APPENDIX A is an XML data type definition (DTD) for an example of a rule-based markup language that may be used in an embodiment.

2.3.2 Rule Broker

RBML broker 310 stores and manages RBML rules. In one embodiment, users can store, delete and query for rules in RBML broker 310 through a Web-based user interface, a SOAP API, or a Java® API. APPENDIX B presents an example of an API for RBML broker 310. In this context, "user" refers broadly to an application program or other software or hardware element that communicates with RBML broker 310 through an appropriate interface.

In one embodiment, a rule insert function is provided. With the rule insert function, a user can insert one or more new rules into the rule repository through a SOAP API or through a direct Java API. If any of the rules already exist in the Rule Broker database, the insert is rejected and a warning message is generated. A process that calls the rule insert function, the process provides a login identifier or login_id and RBML statements that defines the rule. In other embodiments, applications can enable an application specific action on insertion of each rule. This can be achieved by implementing the ModifyActionIF interface defined in APPENDIX B.

When a rule is inserted, a dependency check is run and if dependent rules are not present a warning is flagged, but the rule is inserted. Applications can register a request for notification when a rule of interest is added to RBML broker 310. Table 2 is a list of parameters that may be included in a request to insert a rule.

TABLE 2

PARAMETERS FOR INSERT RULE REQUEST

| Parameter | Source | Mandatory/ Optional | Default Value | Description |
|---|---|---|---|---|
| Login Id | Function parameter | Mandatory | — | User Id of person/ application performing the operation |
| Owner Id | Function parameter | Optional | $login_id | Who owns the rule - may be different than login_id or Author. If owner_id is 'system' then it is a general rule. |
| Name | RBML | Mandatory | — | Name and XPath together are unique to any rule. |
| XPath | RBML | Implicit | | |
| Technology | RBML | Optional | "unknown" | |
| Platform | RBML | Optional | "unknown" | |
| Creation Date | RBML | Optional | system date | When rule was created - not necessarily the date when added to Rule Broker. |
| Expiry Date (age) | RBML | Optional | 90 days | |
| Author | RBML | Optional | $login_id | Author of the rule - may be different than login_id or owner_id |
| Reviewer | RBML | Optional | $author | |
| Organization | RBML | Optional | "all" | |

In a rule replace function, a user can replace or modify one or more existing rules through the SOAP API or direct Java API. If any of the rules is new, it is inserted as a new rule. When calling the replace operation, the user supplies a login_id and RBML statements representing the rule. Applications can enable application specific action on replacement of each rule, for example, by implementing the ModifyActionIF interface defined in APPENDIX B.

Previous dependency information is deleted, and the dependency check is run again on each rule. If dependent rules are not present, then a warning is flagged but the rule is replaced. Applications can register a request to be notified when a rule of interest is replaced or modified in the Rule Broker. Table 3 is a list of parameters that may be included in a rule replacement request:

TABLE 3

RULE REPLACE REQUEST

| Parameter | Source | Mandatory/ Optional | Default Value | Description |
|---|---|---|---|---|
| Login Id | Function parameter | Mandatory | — | User id of person/ application performing the operation |
| Owner Id | Not Required | Not Editable | | |
| Name | RBML | Not Editable | — | Name and XPath together are unique to any rule. |
| XPath | RBML | Not Editable | | |
| Technology | RBML | Optional | "unknown" | |
| Platform | RBML | Optional | "unknown" | |
| Creation Date | RBML | Optional | system date | When rule was created - not necessarily the date when added to Rule Broker. |
| Expiry Date (age) | RBML | Optional | 90 days | |
| Author | RBML | Optional | $login_id | Author of the rule - may be different than login_id or owner_id |
| Reviewer | RBML | Optional | $author | |
| Organization | RBML | Optional | "all" | |

In a rule upload function, users can upload a file containing one or more rules, for example, through a Web user interface. If the uploaded rules already exist in the RBML broker 310, a warning is generated, but the user is permitted to proceed and replace the existing rules. In one embodiment, the rule upload function performs in the same manner described above for the rule insert function and rule replace function depending upon the context. In an embodiment, an owner_id value for an upload operation is "system".

In a rule delete function, users can delete one or more rules by specifying a rule_id or name-xpath pair. A user application can also delete the rules through the Web UI by selecting a list of rules. Rule dependency information is also deleted. The rules dependent on the deleted rules are marked as having dependency exception. The rules are deleted permanently from the rule repository 312.

In this context, rule dependency refers to a rule having a reference to another rule. A rule can have a reference to other rules. The reference may reflect a parent-child dependent relationship to other rules. The dependency information is stored and updated on insert, replace, modify and delete operations.

When a rule is inserted into the rule repository 312, dependency information is created and stored for that rule. If the rules dependent on the then-current rule are not present in the rule repository 312, then the dependency exception for that rule is generated and the rule is marked invalid. The rules dependent on the inserted rule are revalidated. When a rule is deleted, the dependency information for that rule is also deleted. The rules dependent on the deleted rules are invalidated and marked as having a dependency exception. Rule dependency processing for a replace operation or modify operation is combination of the processing performed by the delete operation and insert operation.

In one embodiment, a dependency exception report is generated that contains a list of missing rules and rules dependent on the missing rules. As a result, a user can re-create dependencies for a rule from the Dependency exception report.

In another embodiment, the RBML broker 310 stores a rule history. The rule history comprises a history for the rules and comprises, in one embodiment, for each rule, each operation that has been performed, e.g., insert, replace, etc., the user that performed an operation, the date of modification and comments. In one embodiment, the history can be viewed from the Web UI.

In one embodiment, RBML broker 310 implements an access policy. Under one implementation of the policy each user is either a regular user or administrative user. Regular users can only view rules and cannot delete or upload the rules. Administrative users can view, delete and upload all the rules. In various other embodiments, a quick search, advance search, rule query, and rule viewing services are provided. Using the quick search service, a user can perform a quick search based on XPath, author ID or technology, optionally using wildcard characters for search parameters. In the advance search service the user can perform a search based upon a combination of criteria and match operators.

A SOAP service may provide a rule query function in which various attributes of rules can be queried. In one embodiment, the SOAP service enables a user application to perform the insert rule operation, the replace rule operation, a query to determine whether a particular rule exists in RBML broker 310, a retrieve rule operation, or an application-specific query, as further defined in APPENDIX B.

In a rule viewing operation, rules can be viewed either in HTML format using XSL or as raw XML. In rule viewing, RBML broker 310 provides a URL that is based upon the rule_id or a name-xpath pair. Other applications can link to the URL from a web page associated with the application.

3.0 DIAGNOSIS ENGINE

In one embodiment, diagnosis engine 318 functions to read and interpret diagnosis rules, parse command output that is received from a device in response to execution of diagnosis rules, analyze key data elements picked up by parsing, and deliver results and recommendations. Diagnosis engine 318 also can directly accept key data elements or variables for analysis.

Figure 6:
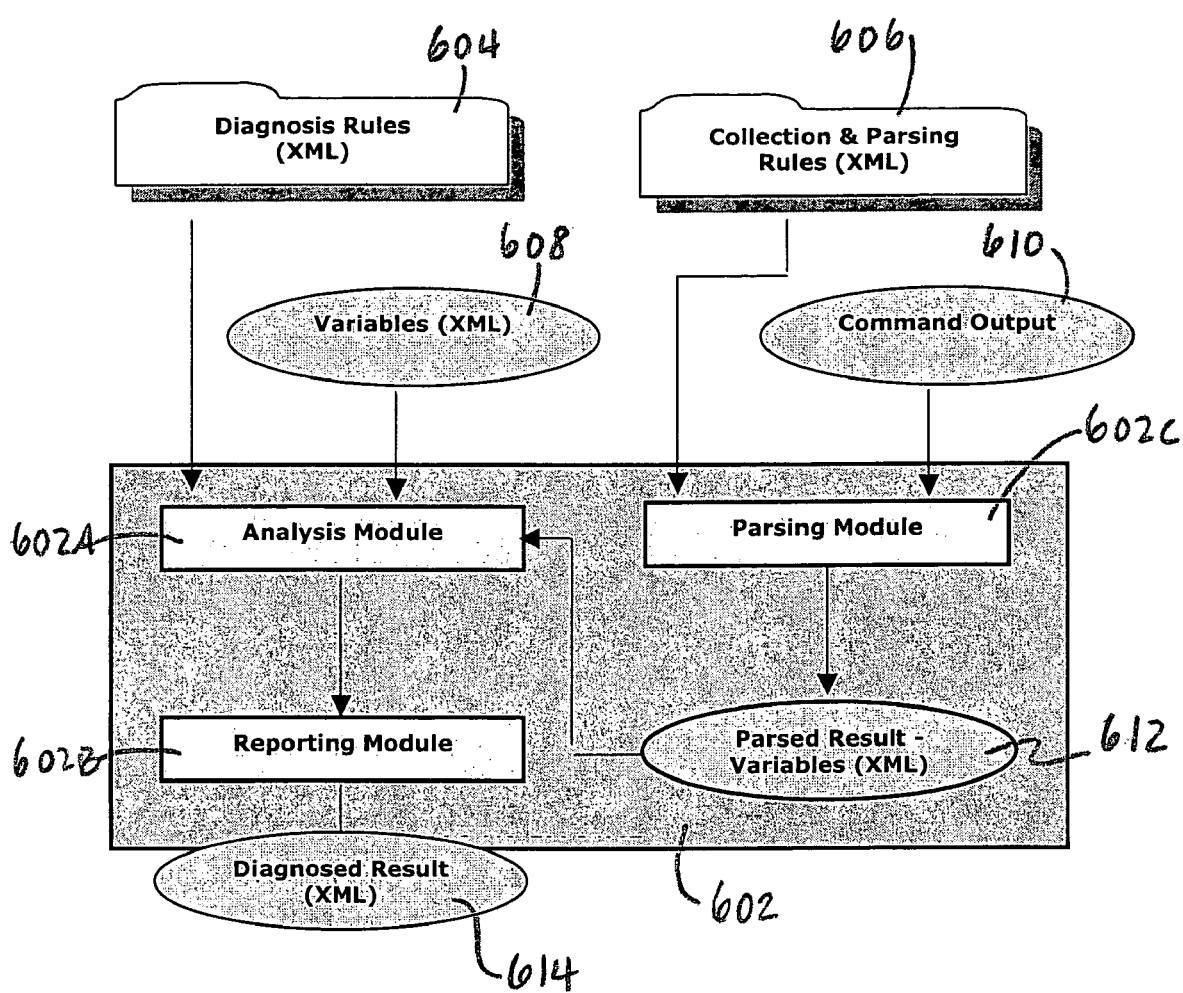
FIG. 6 is a block diagram of an example architecture and data flow for a diagnosis engine.

In one embodiment, diagnosis engine 318 is implemented as an object or process that functions independently except for rules that are received from RBML broker 310. FIG. 6 is a block diagram of an example architecture and data flow for a diagnosis engine 606. Diagnosis rules 604 defined in one or more diagnosis documents 210 specify evaluations that are applied on variables 608 and command output 610 that are received from the collection engine. The command output 610 may be parsed by parsing module 602C from command-line interface commands captured from devices through Telnet sessions, for example. Variables 608 may be Simple Network Management Protocol (SNMP) Management Information Base (MIB) values, for example. Analysis module 602A performs evaluations that may comprise a combination of arithmetic, logical, and relational expressions that operate on the variables.

Table 4 presents an example of one or the diagnosis rules 604:

TABLE 4

DIAGNOSIS RULE

```
<rbml>
  <diagnosis>
    <name>sh_proc_mem</name>
    <profile>
      <technology_name>IOS</technology_name>
    </profile>
    <summary>
      <author>Keith Sinclair</author>
      <creation_date>18 August 2002</creation_date>
      <application>Output Library</application>
    </summary>
    <diag>
      <symptom>
        <name>show_processes_memory</name>
        <type>collection</type>
      </symptom>
      <evaluation>
        <name>main_evaluation</name>
        <evaluate>
   <name>check_free</name>
   <criteria>($free_mem$ / $total_mem$ ) lt 0.1
     </criteria>
   <result>Memory Low Used=$Used$ Free=$Free$
     </result>
   <level>4</level>
        </evaluate>
      </evaluation>
    </diag>
  </diagnosis>
</rbml>
```

Definitions for variables 608 are provided in a Collection RBML document, with instructions on how to parse the variables from the command output 610. Typically, one or more variables 608 are parsed out of a line of command output 610. This variable and its values form a data set. The data set could be repeated if the same variables 608 are parsed out from multiple lines, such that variables could have multiple values.

Variables 608 may be hierarchical, such as groups or subgroups, in a structure that is defined, for example, based on organization of the information, and not just on how information is laid out in the commands. Variables 608 could also represent SNMP MIB objects.

Each of the diagnosis rules 604 as specified in a diagnosis document 210 can have multiple evaluations delimited by <evaluations> tags. Each <evaluation> may have multiple <evaluate> tags. Each evaluate tag can have a criteria that defines a Boolean expression to be evaluated, in the form of zero or more <operation>s, which are statements that can have side effects on variables. Table 5 presents an example criteria evaluation:

TABLE 5

CRITERIA EVALUATION FOR VARIABLE SET OR ROW

<evaluate>
 <name> check_status </name>
 <criteria admin eq "up" and line ne "up"</criteria>
 <return> true </return>
 <result level="3">$interface$ is administratively up but the
   protocol is down</result>
 <result level="4">Some dummy result.</result>
 <recommendation level="4">Fix this thing . . . </recommendation>
 <exception level="3">some exception info</exception>
</evaluate>

The <criteria> tag identifies the Boolean expression. For example, a criteria tag may indicate 'admin eq "up" and line ne "up"'. Expressions evaluate to true or false. The <criteria> tag is optional and if not present, the <evaluate> is assumed to be always true.

Each <evaluate> tag can have an associated name that is also treated as a rule created variable defined in <intialise>, and can be used in other expressions or criterion. The value obtained by evaluating the expression (true or false) is assigned to the variable ('check_status' in the above example). The <evaluate> name is also useful in defining result suppression and rule suppression. Any appropriate operators can be used in evaluation expressions.

In one embodiment, when variables have multiple values, the variables are evaluated for every occurrence. If a required variable is missing in the input variable (or local rule variables defined in the <initialise> section), the rule is rejected.

Results 612, 614 may comprise descriptive reports of the evaluation, including variable names. In one embodiment, variables in the descriptive text are interpolated with actual values to make the report meaningful. Recommendations and exceptions also may comprise descriptive texts that return in the response if the <criteria> succeeds, and may have variables that need to be interpolated. In one embodiment, results and recommendations are reported only if the Boolean result of the expression equals the Boolean value specified under the <return> tag. For example, if the expression evaluated to 'false' and the <return> value is defined as 'false', then the diagnostic result is reported. Since <criteria> is optional, the <evaluate> always succeeds if <criteria> is not defined. In one approach, <result>s, <recommendation>s, <exception>s, and callback <function>s in an <evaluate> are all executed after processing the <criteria> and all <operation>s (regardless of how they are laid out in the <evaluate>).

Diagnosed result 614 and parsed result 612 may be suppressed, in one embodiment, by specifying a <suppress> tag. In one embodiment, the <suppress> tag has two contexts; a first context is result suppression, when defined inside an <evaluate>, and a second context is rule suppression, when defined inside <diagnose> in hierarchical rule definitions. For result suppression, the following processes are used.

First, there can be multiple evaluate tags in the diagnosis rule. Sometimes a set of evaluates may signify the same problem, but vary only in the severity of the same problem. For example, very_low_uptime (uptime <15 minutes) and low_uptime (uptime <1 hour) are similar evaluates but vary in severity. If very_low_uptime evaluates to true, then low_uptime also evaluates to true. However, it is preferable to report very_low_uptime and suppress low_uptime. In such cases, a rule can define that very_low_uptime should suppress low_uptime in the diagnosis rule.

The <evaluate> suppression only suppresses results and does not suppress processing the <criteria> and <operation> of the <evaluate>. However, hierarchical rule suppression specified under <diagnose>/<suppress> completely prevents the <evaluate> from processing.

Order attributes define an order in which <evaluate> tags are processed. If an order attribute is not defined, the <evaluate>s are processed in the order presented.

Each evaluate can define multiple results and recommendations, each having with a varying degree verbosity expressed in a 'Level' attribute value. If the diagnostic request is made with a specific verbosity level, then a diagnosis document 210 can restrict reporting of results based on the verbosity level. Level 1 has lower priority or severity compared to level 5. For example, if the verbosity level requested in the report is 5, and the evaluate has three results with Level 3, 5 and 6, only results with level 5 and above are reported. In this example, the results with level 5 and 6 are reported. The same rules also apply for recommendations.

The diagnosed result 614 is provided by the reporting module 602B in an XML document, in one embodiment. Table 6 presents an example diagnosed result.

TABLE 6

EXAMPLE DIAGNOSED RESULT

<rbml>

<name>show_ip_blah</name>
  <type>diagnosis</type>
  <evaluate_name>check_blah</evaluate_name>
  <key>
   <name>area</name>
   <value>1</value>
  </key>
  <key>
   <name>ls_id</name>
   <value>10.23.44.56</value>
  </key>
  <description level="1">this is all about blah.</description>
  <recommendation level="1">this is only bad when the blah is
    misconfigured.</recommendation>
  <recommendation level="5">the blah is really badly done on this
    widget!</recommendation>
  <exception level="1">misconfigured blah.</exception>
  <result level="1">the blah was found to be misconfigured.</result>
  <category>routing protocol blah</category>

<name>show_version_blah</name>
  <type>diagnosis</type>
  <evaluate_name>check_blah</evaluate_name>
  <description level="1">this is all about blah.</description>
  <recommendation level="1">this is only bad when the blah is
    misconfigured.</recommendation>
  <recommendation level="5">the blah is really badly done on this
    widget!</recommendation>

TABLE 6-continued

EXAMPLE DIAGNOSED RESULT

```
    <exception level="1">misconfigured blah.</exception>
    <result level="1">the blah was found to be misconfigured.</result>
    <category>security</category>
    <function>
      <name>stack_decoder</ name>
      <var>some value here</var>
      <var>another value here</var>
    </function >

</rbml>
```

Presentation of results is performed by applications using the information in the XML Results document. Triggers or callbacks are returned in the results as <function>s tags if they are defined in the rules. These <function>s tags can help the calling application to take appropriate actions.

In one embodiment, diagnosis engine 602 of FIG. 6 provides predefined functions for use in expressions in <operation> and <criteria>. For example, a predefined function for an <operation> may be $$push($list_var$, " . . . "), and adds a value at the end of a list variable declared in the rule. Many other predefined functions may be provided for the convenience of the developer or user.

In another embodiment, Diagnosis Engine 602 has an interface to directly accept variables and values in an XML format, thereby avoiding data collection and parsing. Table 5 presents an example request that an Output Interpreter application would use to provide direct output.

TABLE 7

EXAMPLE REQUEST

```
<request>
  <application>Output Interpreter</application>
  <category>bgp</category>
  <category>ios</category>
  <verbosity>5</verbosity>
<data>
<command>sh_interface</command>
  <dataset>
  <fast_e>Ethernet0</fast_e>
  <mac_addr>00d0.58a4.452a</mac_addr>
  <line_state>down</line_state>
  <ip_addr>10.3.3.1</ip_addr>
    </dataset>
    <dataset>
  <fast_e>Ethernet1</fast_e>
  <mac_addr>00d0.58a4.452b</mac_addr>
  <line_state>up</line_state>
  <ip_addr>171.68.118.101</ip_addr>
    </dataset>
 </data>
   <data>
<command>sh_ip_ospf_data_rout</command>
<dataset>
 <proc_id>5</proc_id><router_id>10.238.10.1</router_id>
 <dataset> <area>0</area>
  <dataset>
   <ls_id>10.238.1.4</ls_id><age>1704</age>
  </dataset>
  <dataset>
   <ls_id>10.238.1.5</ls_id><age>1470</age>
  </dataset>
 </dataset>
 <dataset> <area>1</area>
  <dataset>
   <ls_id>10.238.10.1</ls_id><age>1773</age>
  </dataset>
  <dataset>
   <ls_id>10.238.10.4</ls_id><age>1236</age>
```

TABLE 7-continued

EXAMPLE REQUEST

```
  </dataset>
 </dataset>
</dataset>
</data>
   </request>
```

In one embodiment, variables are not repeated within the same dataset, but are specified in different datasets. A separate <data> tag encloses variables from each command. Variables without value (optional variables) are included in the request with empty values. The relationship between variables (structure) should be consistent. The same variable cannot be defined in two different contexts. To diagnose multiple commands, all command output is provided in the same request.

In another embodiment, Diagnosis Engine 602 allows nesting of diagnosis rules 604. For example, a parent rule may contain multiple child rules. The suppress feature can be used effectively to suppress an entire hierarchy. The final diagnosis is done at the end of processing. In nested rules, the <evaluate> name is unique within the diagnosis rule. Rules can be included or suppressed by naming the rule template (diagnosis name), <evaluation> name and/or <evaluate> name. If no <suppress> or <include> is specified, all items in the rule are included by default. If <include> is specified, then only those items are included from the rule. If <suppress> is specified then all but the items defined in the <suppress> are included from the rule. Both <include> and <suppress> cannot be defined for the same inherited rule; it can have either <include> or <suppress> or none. All created variables used in the inherited rules are automatically initialized according to the definitions in the inherited rule definitions. If more than one rule is picked up for processing, all final evaluates from each rule are fired after processing all the rules.

In various embodiments, variable namespace prefixes are provided in variable names, and special handling is provided for variables having unknown or null values.

As a summary, the following general control flow may be utilized by Diagnosis Engine 602. First, in the diagnosis rules 604 or diagnosis documents 210, <evaluation> is the basic rule block and must have a name. Each <evaluation> may have one or more <evaluate>s or <evaluation>s. A <diagnosis> has one or more <diag>s and each <diag> may have one or more top-level <evaluation>s. Defining a <key> in an <evaluation> creates a for-each loop on the <dataset> that holds the <key> variable. A nested for loop can be simulated by defining nested <evaluation>s each with a specific <key>. The <evaluate>s cannot be nested. Table 8 presents pseudo-code of processing logic that may be used:

TABLE 8

PSEUDO-CODE - DIAGNOSIS ENGINE

```
    Foreach <evaluation> {
      do_evaluation
    }
    // Evaluation can contain multiple if/then/else blocks or
    // can have <evaluation>s and <evaluate>s
    Sub do_evaluation {
      get_all_values_of_KEY_variable
      foreach value of KEY_variable
      {
        if (defined if-else-block)
        {
```

TABLE 8-continued

PSEUDO-CODE - DIAGNOSIS ENGINE

```
      if (<expression> is TRUE)
         do THEN_Block (THEN_Block is also an <evalution>)
      else
         do ELSE_Block (ELSE_Block is also an <evalution>)
    }
    else
    {
      foreach (<evaluation>|<evaluate>) {
        if (<evaluation> then do_evaluation
        if (<evaluate>) then do_evaluate
        }
      }
    }
  }
      Sub do_evaluate {
 get_var_names_in_evaluate
 get_all_variable_set_combinations
 foreach var_set {
 perform <criteria>
 if (<criteria> is true or no <criteria>)
 {
   perform ALL
                  <operation> |
                  <result> |
                  <recommendation> |
                  <exception> |
                  <function> (callback function)
  }
 }
}
```

Once the criteria is successful, other elements defined inside the <evaluate> (<operation>, <result>, <recommendation><exception>, <function>) are executed in the same order defined inside the <evaluate>.

In certain embodiments, external code libraries may implement functions of the Diagnosis Engine. For example, the Java Expression Parser (JEP) is used to evaluate expressions and the Apache-ORO is used for manipulating regular expressions in Java.

4.0 IMPLEMENTATION MECHANISMS

Hardware Overview

Figure 7:
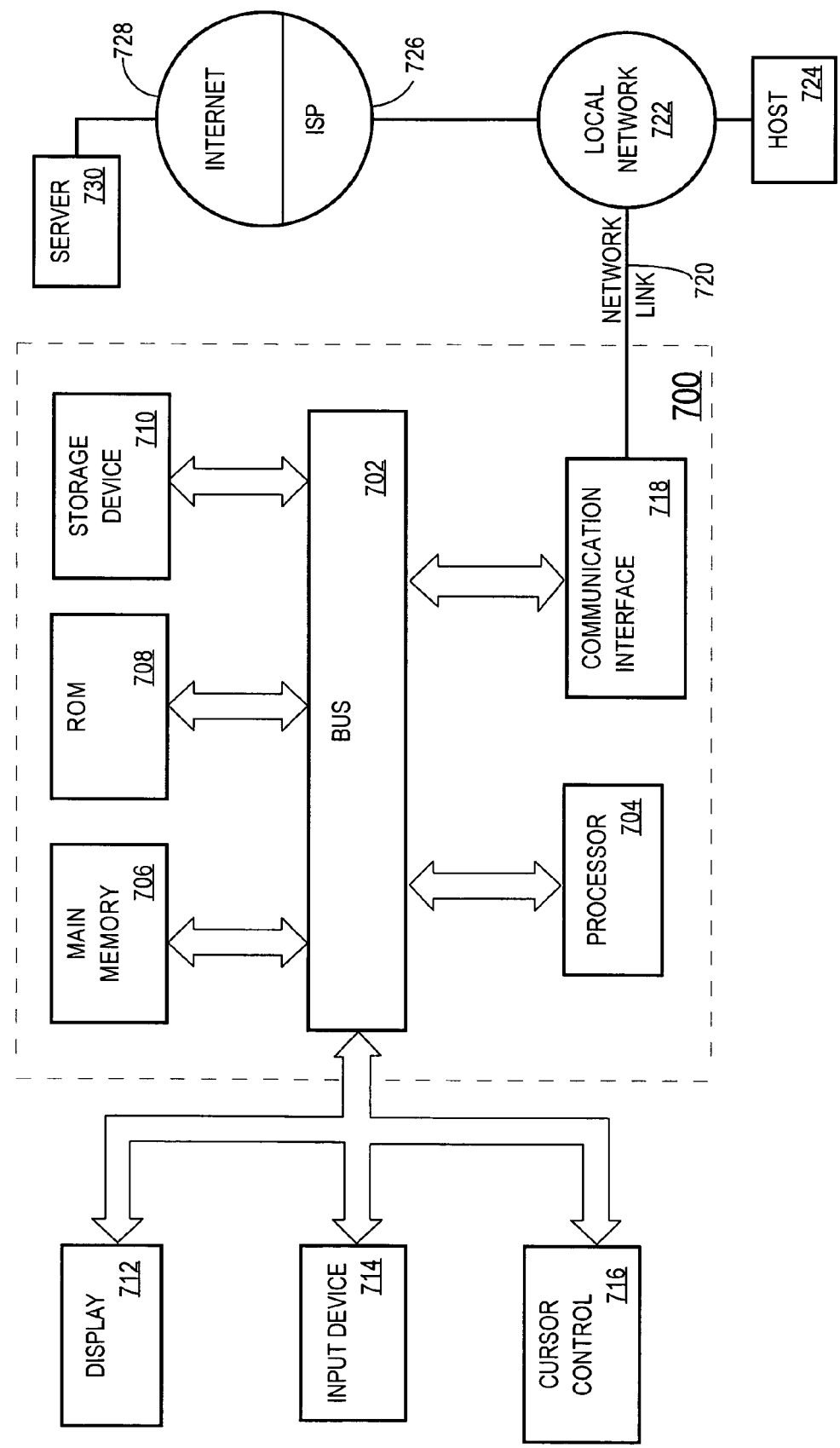
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for rule-based network management approaches. According to one embodiment of the invention, rule-based network management approaches are provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for rule-based network management approaches as described herein.

The received code may be executed by processor 704 as it is received, and/or stored in storage device 710, or other non-volatile storage for later execution. In this manner, computer system 700 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX A

RBML XML-COMPLIANT DATA TYPE DEFINITION (DTD)

```
<!ELEMENT rbml (inventory*, technology*, feature*, best_practice*, symptoms*,
problem*, diagnosis*, troubleshooting*, results*)>
<!-
    XML DTD Speak:
        * means zero or more elements
    ? means zero or one elements
    + means one or more elements
—>
        <!- Inventory RBML ->
        <!ELEMENT inventory (devices?, models?, cards?, interfaces?, images?,
invent_rules?)>
            <!ELEMENT devices (device*)>
            <!ATTLIST devices version NMTOKEN #IMPLIED>
                <!ELEMENT device (name, mdf_name?, mdf_path?, type, os,
model_name, chassis_type, product__name, product_group, sysObjectID*, sw_platform?,
ddts_components?, annotation?, notes?, command*)>
            <!ELEMENT models (model*)>
                <!ELEMENT model (name, extends?, chassis_model?, cards_model?,
interface_model?, address_model?, performance_model?)>
                <!ATTLIST model version NMTOKEN #IMPLIED>
                    <!ELEMENT chassis_model (record*)>
                    <!ELEMENT cards_model (record*)>
                    <!ELEMENT interface_model (record*)>
                    <!ELEMENT address_model (record*)>
                    <!ELEMENT performance_model (system_model?,
interface_model?)>
                    <!ELEMENT system_model (record*)>
                        <!ELEMENT record (name, data_type, snmpvar?, oid?, mib_file?,
table_var?, symptom?)>
            <!ELEMENT cards (card*)>
            <!ATTLIST cards version NMTOKEN #IMPLIED>
                <!ELEMENT card (name, type, mib_file?, snmpvar, oid, index,
ddts_components, description?, annotation?, notes?)>
            <!ELEMENT interfaces (interface_type*)>
            <!ATTLIST interfaces version NMTOKEN #IMPLIED>
                <!ELEMENT interface_type (name, type, interface_group, mdf_,path?,
mib_file!, snmpvar?, oid?, index?, description?, annotation?, notes?)>
            <!ELEMENT images (image*)>
            <!ATTLIST images version NMTOKEN #IMPLIED>
                <!ELEMENT image (name, os, sw_platform?, feature_set?,
mdf_name?, mdf_path?, annotation?, notes?, match)>
            <!ELEMENT invent_rules (invent_rule*)>
            <!ELEMENT invent_rule (name, profile, ddts_components?, action?)>
            <!ATTLIST invent_rule version NMTOKEN #IMPLIED>
        <!- Technology RBML ->
        <!ELEMENT technology (name, description mdf_name?, mdf_path?, link*, requires,
```

APPENDIX A-continued

RBML XML-COMPLIANT DATA TYPE DEFINITION (DTD)

```
keywords?, bu?, annotation?, notes?, technologies?, features?)>
        <!ATTLIST technology version NMTOKEN #IMPLIED>
        <!—Feature RBML —>
        <!ELEMENT feature (name, type, active?, mdf_path?, block, criteria,
ddts_components?, keywords?, bu?, profile, summary, config?, snmp?, annotation?, notes?)>
        <!ATTLIST feature version NMTOKEN #IMPLIED>
        <!- Best Practice RBML ->
        <!- ELEMENT best_practice (configuration*)>
        <!ELEMENT configuration (name, title?, active, except_for?, block?, criteria,
annotation?, notes?, match, profile, summary, corrective_action?)>
        <!ATTLIST configuration version NMTOKEN #IMPLIED>
        <!- Symptoms RBML ->
        <!ELEMENT symptoms (event*, collection*)>
        <!ATTLIST symptoms version NMTOKEN #IMPLIED>
        <!ELEMENT event (name, title?, type, level, state, link*, annotation?, notes?,
profile?, summary?, match*, oid?, snmpvar*)>
            <- unique event name, links to problem —> correlation ->symptom -
>
            <!— the type of event, trap, syslog, etc ->
            <!— Threshold is to define what will trigger the given symptom,
should be flexible to
            allow for simple boolean rules, over 90, greater then or equal to 1000,
this willd be
            dealing with many type of collected data ->
            <!- Over what period of time the threshold is valid ->
        <!ELEMENT collection (name, title?, type, scope, repetitions, frequency,
annotation?, notes?, profile?, summary?, snmp?, command?)>
            <!- unique collection name, links to problem -> correlation ->
symptom ->
            <!- the method of collection SNMP, telnet, etc ->
        <!ELEMENT command (exec, exec_regex?, format?, anchor*,
anchor_var?, anchor_reset?, sub_anchor*, sub_anchor_var?, sub_anchor_reset?, linenum?,
values?, nested?, match*, table*, statistics?)>
        <!ELEMENT table (name, anchor*, anchor_var?, sub_anchor*,
sub_anchor_var?, values, match*)>
        <!ELEMENT statistics (statistic*)>
        <!ELEMENT statistic (var, data_type, unit?, mandatory?, description?,
operation?)>
        <!- Problem RBML ->
        <!ELEMENT problem (name, title?, active, annotation?, notes?, profile, summary,
correlation?, diagnose*, collect*, action?, corrective_action?)>
        <!ATTLIST problem version NMTOKEN #IMPLIED>
        <!ELEMENT diagnose (name, dependant?, (include|suppress)?, annotation?,
notes?)>
        <!-<!ELEMENT diagnose (#PCDATA|name)*>->
        <!ELEMENT correlation (requires?, expression?, symptom*, annotation?,
notes?)>
            <!- For applying boolean logic to correlation ie all, any or
combinations of the symptom elements —>
        <!ELEMENT symptom (name, type, var?, threshold?, seconds?,
expression?, annotation?, notes?)>
            <!- unique symptom name, links to symptoms -> event or
collection ->
            <!- the type of symptom ie event or collection ->
        <- Diagnosis RBML ->
        <!ELEMENT diagnosis (name, active, annotation?, notes?, profile, summary,
initialise?, diag+, final_diagnosis*)>
        <!ATTLIST diagnosis version NMTOKEN #IMPLIED>
        <!ELEMENT initialise (var+)>
        <!ELEMENT diag (symptom*, diagnose*, evaluation*)>
        <!ELEMENT evaluation (name?, key?, index?, sort?, annotation?,
notes?, (if|evaluate|elevaluation)*)>
        <!ELEMENT if (expression, then, else?)>
        <!ELEMENT then (evaluation+)>
        <!ELEMENT else (evaluation+)>
        <!ELEMENT evaluate (name?, author?, date?, criteria?, operation*,
suppress?, return?, symptom_name?, result*, recommendation*, exception*, function*,
technology_name?, category?, problem_type?, osi_layer?, level?, link*, doc_ref*,
annotation?, notes?)>
        <!ATTLIST evaluate order NMTOKEN #IMPLIED>
        <!ELEMENT suppress (name+)>
        <!ELEMENT include (name+)>
        <!ELEMENT final_diagnosis (name, criteria, suppress?, diagnose?,
corrective_action?, return?, recommendation*, exception*, technology_name?, category?,
problem_type?, osi_layer?, level?, link*, doc_ref*, annotation?, notes?)>
        <!—Troubleshooting RBML —>
        <!ELEMENT troubleshooting (name, active, annotation?, notes?, profile, summary,
```

APPENDIX A-continued

RBML XML-COMPLIANT DATA TYPE DEFINITION (DTD)

symptom*, diagnose*, problems*)>
    <!ELEMENT results (name, type, evaluate_name?, key*, index?, level?, description?, recommendation*, exception*, result*, technology_name?, category?, problem_type?, osi_layer?, corrective_action?)>
    <!ELEMENT problems (problem_name+)>
    <!- Corrective Action RBML ->
    <!ELEMENT corrective_action (description, config_change*, exec_command*, snmp*, annotation?, notes?)>
    <!ELEMENT config (match*)>
    <!ELEMENT snmp (snmpvar, oid, mib_file?, type?, data_type, operation?, criteria?, value?)>
  <!- type = set or get ->
<!- Common RBML Objects ->
    <!ELEMENT action (log*, notify*, shell*, function*)>
    <!ATTLIST action version NMTOKEN #IMPLIED>
      <!ELEMENT notify (type, string, level, target*)>
      <!ATTLIST notify version NMTOKEN #IMPLIED>
        <!- Targets for the notification, ie email address, trap or syslog servers, etc —>
      <!ELEMENT target (#PCDATA)>
    <!ELEMENT shell (type, exec)>
    <!ELEMENT function (name, var*)>
      <!ATTLIST function level CDATA #IMPLIED>
      <!ELEMENT collect (name?, type, repetitions?, frequency?, snmp?, exec?)>
      <!ATTLIST collect version NMTOKEN #IMPLIED>
    <!ELEMENT summary (author, contributor?, reviewer?, publisher?, creation_date, edit_date?, review_date?, age, organisation?, group*, application*, coverage?, apply?, description, recommendation?, caveat?, effect?, risk?, exception?, technology_name?, category?, problem_type?, osi_layer?, confidence?, priority?, weight?, link*, doc_ref*, annotation?, notes?)>
    <!ATTLIST summary version NMTOKEN #IMPLIED>
    <!ELEMENT profile (technology_name?, feature_name?, scope?, platform?, product_group*, product_name*, os?, version*, sw_version?, hw_version?, group?, device_type?, device_role?, device_name?, card_name?, interface_name?, annotation?, notes?)>
    <!ATTLIST profile version NMTOKEN #IMPLIED>
    <!- match should be for regular expression functionality to allow flexibility in event handling ->
    <!ELEMENT match (line*, multi_line*)>
    <!ATTLIST match version NMTOKEN #IMPLIED>
      <!ELEMENT line (var?, regex, annotation?, notes?)>
      <!ELEMENT multi_line (name, criteria?, block?, var?, regex, annotation?, notes?)>
    <!ELEMENT technologies (technology_name+)>
    <!ELEMENT features (feature_name+)>
    <!ELEMENT link (#PCDATA)>
      <!ATTLIST link level CDATA #IMPLIED>
      <!ATTLIST link url CDATA #IMPLIED>
    <!ELEMENT doc_ref (#PCDATA)>
      <!ATTLIST doc_ref url CDATA #IMPLIED>
    <!ELEMENT criteria (#PCDATA)>
      <!ATTLIST criteria type CDATA #IMPLIED>
<!- Common elements ->
<!- These elements refered alot in this DTD ->
<!ELEMENT name (#PCDATA)>
<!ELEMENT title (#PCDATA)>
<!ELEMENT type (#PCDATA)>
<!ELEMENT key (#PCDATA)>
<!ELEMENT sort (#PCDATA)>
    <!ATTLIST sort order NMTOKEN #IMPLIED>
<!ELEMENT technology_name (#PCDATA|name)*>
<!ELEMENT feature_name (#PCDATA)>
<!ELEMENT problem_name (#PCDATA)>
<!ELEMENT symptom_name (#PCDATA)>
<!ELEMENT model_name (#PCDATA)>
<!ELEMENT chassis_type (#PCDATA)>
<!ELEMENT device_role (#PCDATA)>
<!ELEMENT device_type (#PCDATA)>
<!ELEMENT device_name (#PCDATA)>
<!ELEMENT card_name (#PCDATA)>
<!ELEMENT os (#PCDATA)>
<!ELEMENT mib_file (#PCDATA)>
<!ELEMENT product_name (#PCDATA)>
<!ELEMENT product_group (#PCDATA)>
<!ELEMENT mdf_name (#PCDATA)>
<!ELEMENT mdf_path (#PCDATA)>
<!ELEMENT threshold (#PCDATA)>

APPENDIX A-continued

RBML XML-COMPLIANT DATA TYPE DEFINITION (DTD)

```
<!ELEMENT seconds (#PCDATA)>
<!ELEMENT string (#PCDATA)>
<!ELEMENT active (#PCDATA)>
<!ELEMENT log (#PCDATA)>
<!ELEMENT author (#PCDATA|name)*>
<!ELEMENT contributor (#PCDATA|name)*>
<!ELEMENT reviewer (#PCDATA|name)*>
<!ELEMENT publisher (#PCDATA|name)*>
<!ELEMENT category (#PCDATA|name)*>
<!ELEMENT coverage (#PCDATA|name)*>
<!ELEMENT date (#PCDATA)>
<!ELEMENT creation_date (#PCDATA)>
<!ELEMENT edit_date (#PCDATA)>
<!ELEMENT review_date (#PCDATA)>
<!ELEMENT age (#PCDATA)>
<!ELEMENT organisation (#PCDATA)>
<!ELEMENT application (#PCDATA)>
<!ELEMENT confidence (#PCDATA)>
<!ELEMENT apply (#PCDATA)>
<!ELEMENT description (#PCDATA)>
<!ELEMENT effect (#PCDATA)>
<!ELEMENT risk (#PCDATA)>
<!ELEMENT problem_type (name)*>
<!ELEMENT osi_layer (name)*>
<!ELEMENT priority (#PCDATA)>
<!ELEMENT weight (#PCDATA)>
<!ELEMENT except_for (#PCDATA)>
<!ELEMENT block (#PCDATA)>
<!ELEMENT exception (#PCDATA)>
        <!ATTLIST exception level CDATA #IMPLIED>
<!ELEMENT recommendation (#PCDATA)>
        <!ATTLIST recommendation level CDATA #IMPLIED>
<!ELEMENT caveat (#PCDATA)>
        <!ATTLIST caveat level CDATA #IMPLIED>
<!ELEMENT config_change (#PCDATA)>
<!ELEMENT exec_command (#PCDATA)>
<!ELEMENT format (#PCDATA)>
<!ELEMENT evaluate_name (#PCDATA)>
<!-- The statefullness of the event. -->
<!ELEMENT state (#PCDATA)>
<!ELEMENT version (#PCDATA)>
<!ELEMENT group (#PCDATA)>
<!ELEMENT platform (#PCDATA)>
<!ELEMENT feature_set (#PCDATA)>
<!ELEMENT exec (#PCDATA)>
<!ELEMENT exec_regex (#PCDATA)>
<!ELEMENT anchor (#PCDATA)>
<!ELEMENT anchor_var (#PCDATA)>
<!ELEMENT anchor_reset (#PCDATA)>
<!ELEMENT sub_anchor (#PCDATA)>
<!ELEMENT sub_anchor_var (#PCDATA)>
<!ELEMENT sub_anchor_reset (#PCDATA)>
<!ELEMENT linenum (#PCDATA)>
<!ELEMENT values (#PCDATA)>
<!ELEMENT nested (#PCDATA)>
<!ELEMENT var (#PCDATA)>
<!ELEMENT regex (#PCDATA)>
<!ELEMENT sw_platform (#PCDATA)>
<!ELEMENT ddts_components (#PCDATA)>
<!ELEMENT keywords (#PCDATA)>
<!ELEMENT bu (#PCDATA)>
<!ELEMENT scope (#PCDATA)>
<!ELEMENT oid (#PCDATA)>
<!ELEMENT sysObjectID (#PCDATA)>
<!ELEMENT snmpvar (#PCDATA)>
<!ELEMENT extends (#PCDATA)>
<!ELEMENT table_var (#PCDATA)>
<!ELEMENT index (#PCDATA)>
<!ELEMENT unit (#PCDATA)>
<!ELEMENT notes (#PCDATA)>
<!ELEMENT annotation (#PCDATA)>
<!- data_type is telling us what the data to be collected is, ie absolute,
counter, gauge, milliseconds, etc. This will be assist on how the collection
is handled ->
<!ELEMENT data_type (#PCDATA)>
<!- The number of times to collect the element, if 0 should be forever. ->
<!ELEMENT repetitions (#PCDATA)>
```

APPENDIX A-continued

RBML XML-COMPLIANT DATA TYPE DEFINITION (DTD)

```
<!-- With what frequency to perform the collection. -->
<!ELEMENT frequency (#PCDATA)>
<!ELEMENT operation (#PCDATA)>
<!ELEMENT interface_name (#PCDATA)>
<!ELEMENT interface_group (#PCDATA)>
<!ELEMENT hw_version (#PCDATA)>
<!ELEMENT sw_version (#PCDATA)>
<!ELEMENT value (#PCDATA)>
<!- The criticaly of the symptom, event, problem should be 0-9. -->
<!ELEMENT level (#PCDATA)>
<!ELEMENT result (#PCDATA)>
        <!ATTLIST result level CDATA #IMPLIED>
<!ELEMENT return (#PCDATA)>
<!ELEMENT requires (#PCDATA)>
<!ELEMENT expression (#PCDATA)>
<!ELEMENT mandatory (#PCDATA)>
<!ELEMENT dependant (#PCDATA)>
```

APPENDIX B

Rule Broker API

This Appendix describes an implementation for accessing rule broker services through SOAP. In an embodiment, the RBML broker 310 uses a request-response mode. The request and response formats for all rule broker services follow formats defined, for example, in the following template:

```
<query>
    <request>
        <$param_name> value </$param_name>
        <$param_name> value </$param_name>
    </request>
    <response>
        <error_code> value </error_code>
        <error_msg> value </error_msg>
        <$param_name> value </$param_name>
        <$param_name> value </$param_name>
    </response>
</query>
```

In one embodiment, the error_code can have four values consisting of SUCCESSFUL, WARNING, UNSUCCESSFUL and ERROR. The SUCCESSFUL code means that the service is successful. The WARNING code indicates that a request is successful but with some warnings, e.g. rule dependency warnings. The UNSUCCESSFUL code indicates that a request was complete but unsuccessful. For example, an insert operation was made for an existing rule, or the user did not have permission for the request. The ERROR code indicates that a request encountered some error.

An example implementation of each service is now described.

1. isRuleNameUnique:
   Request Format:

```
<query>
    <request>
        <req_name> /* Required. Name of the Rule */ </req_name>
        <req_xpath>/* Required. xpath of the rule*/ <req_xpath>
    </request>
```

-continued

```
</query>
Response Format:
<query>
    <response>
        <error_code>/*SUCCESSFUL or UNSUCCESSFUL */</error_code>
        <error_msg> /* error details if unsuccessful */ </error_msg>
        <is_unique>/* true or false */ </is_unique>
    </response>
</query>
```

To query both rule name and xpath is required. If rule name is unique in that xpath, is_unique is returned 'true' else returned 'false'. e.g.

```
<query>
<request>
<req_name> BGP Neighbor Logging</req_name>
<req_xpath>/rbml/best_practice/configuration</req_xpath>
</request>
</query>
```

Remember xpath starts with '/' and does not end with 'name'

2. getRbmlRule:
   Request Format:
   User can get entire rbml/xml stream for a list of rules. The rules can be specified in one of the following ways:
   1. a list of rule ids

```
<query>
    <request>
        <req_id> /* Rule Id */ <req_id>
        <req_id></req_id>
    </request>
</query>
```

2. a list of rule name and xpaths.

```
<query>
    <request>
        <req_name> /* Name of the Rule */ <req_name>
        <req_xpath> /* All Rules matching this XPath */ <req_xpath>
        <req_name> /* Name of the Rule */ <req_name>
        <req_xpath> /* All Rules matching this XPath */ <req_xpath>
    </request>
</query>
```

3. a list of xpaths. All the rules matching xpath will be returned. User can specify wild card as well. For example./rbml/best_pract %

```
<query>
    <request>
        <req_id> /* Rule Id */ <req_id>
        <req_id> </req_id>
        <req_xpath> /* All Rules matching this XPath */ <req_xpath>
        <req_xpath> /rbml/best_pract% <req_xpath>
    </request>
</query>
```

User should specify rules in only one of three methods listed above. If rules are specified in more than method in same request only one is accepted and rest are rejected. Methods take precedence in the order listed above.
Response Format:

```
<query>
    <response>
        <error_code>/*SUCCESSFUL or UNSUCCESSFUL */<error_code>
        <error_msg> /* error details if unsuccessful */ </error_msg>
        <rbml_str>
            /* entire rbml of the rule will be pumped here including <rbml>
            tag */
        </rbml_str>
    </response>
</query>
```

Example:
The query returns multiple rule rbmls. Each rbml is enclosed in <rbml_str> block. e.g.

```
            <query>
            <request>
            <req_xpath>/rbml/diagnosis</req_xpath>
            <req_xpath>/rbml/problem</req_xpath>
            </request>
            </query>
```

For example, if there are three in the rule repository 312 for these xpaths then a successful response is:

```
            <query>
            <response>
                <error_code>SUCCESSFUL</error_code>
                <error_msg>SUCCESSFUL</error_msg>
                <rbml_str> /*entire rule RBML */</rbml_str>
                <rbml_str> /*entire rule RBML */</rbml_str>
                <rbml_str> /*entire rule RBML */</rbml_str>
            </response>
            </query>
```

3. insertRule:
If the rule already exists in Rule Broker database then insert request will be rejected.
Request Format:

```
<query>
    <request>
        <login_id> /* Required. Id of who is making this request. This can
be different from the author of the rule or the owner of the rule */
</login_id>
        <owner_id> /* Optional. My or General Rules. For general rule
value should be 'system'. If owner_id is not present then login_id is
taken as owner_id */ <owner_id>
        <rule_rbml>/* Required. The rule RBML <rbml>... </rbml>block */
        </rule_rbml>
    </request>
</query>
```

Response Format:

```
<query>
    <response>
        <error_code>/*SUCCESSFUL or UNSUCCESSFUL */</error_code>
        <error_msg> /* error details if unsuccessful */ </error_msg>
    </response>
</query>
```

4. replaceRule:
The request and response format is same as insertRule. If rule does not exist in the Rule Broker database then rule will be inserted as a new rule.

5. basicQuery:
```
<query>
    <request>
        <query_val>
        /*
```
The field whose value is to be known.
All possible fields are—id, name, technology, platform, xpath, owner_id, author, reviewer, xpath, creation_dt, expiry_dt, review_dt, group and application.

```
        */
    </query_val>
        <query_val>
        </query_val>
        <query_cond>
            /* =, !=, LIKE for all of the fields
            <, >, BETWEEN these are for dates
            e.g. id=45 or name LIKE BGP%
            */
        </query_cond>
        <query cond>
        </query_cond>
    </request>
    <response>
        <error_code>/*SUCCESSFUL or UNSUCCESSFUL */<error_code>
        <error_msg> /* error details if unsuccessful */ </error_msg>
        <row>
```

-continued
```
                /* Each row will have same number of tags as number of fields
                    queried for */
                </row>
                <row>
                </row>
            </response>
        </query>
```

Example: If an application wants to query for rule names and technology of all rules with xpath /rbml/best_practices/ and for a customer say cpy_key wmart. The request is:

```
<query>
    <request>
        <query_val>name</query_val>
        <query_val>technology</query_val>
        <query_cond>
            xpath=/rbml/best_practices/configuration
            /* a variation could be xpath LIKE /rbml/best_practice/%
                This will get all rules under the tree starting with
                /rbml/best_practice/...
            */
        </query_cond>
        <query_cond>cpy_key=wmart</query_cond>
    </request>
</query>
A response to this query would be
<query>
    <response>
        <error_code>SUCCESSFUL</error_code>
        <error_msg>SUCCESSFUL</error_msg>
        <row>
            <name>BGP Neighbor Logging</name>
            <technology>BGP</technology>
        </row>
        <row>
            <name>SNMP Agent IOS</name>
            <technology>Management<technology>
        </row>
        <row>
            <name>EIGRP Neighbor Logging</name>
            <technology>EIGRP</technology>
        </row>
    </response>
</query>
```

APPENDIX C

Example Diagnosis Rules

Sample Rules

Rule-1: This sample rule shows the usage of most of the functions available in the Diagnosis Engine

```
<rbml>
    <diagnosis version="1.0">
        <name>test2</name>
        <active>true</active>
        <profile version="1.0">
            <technology_name>IOS</technology_name>
            <scope>Node</scope>
        </profile>
        <summary version="1.0">
            <author>Suresh</author>
            <creation_date>9/15/2002</creation_date>
            <age>3 months</age>
            <organisation>Cisco Systems</organisation>
```

-continued
```
            <group>Customer Advocacy</group>
            <application>Output Interpreter</application>
            <apply>Diagnosis</apply>
            <description>A feature Test</description>
        </summary>
        <initialise>
            <var>$wds$ = ( )</var>
            <var>$c_wds$ = 0</var>
            <var>$trm$ =""</var>
            <var>$maskXOR$ =""<var>
            <var>$bitop$ ="38 </var>
            <var>$m_loop$ =0</var>
            <var>$m_loop2$ =( )</var>
            <var>$m_header$ =( )</var>
            <var>$count_cp$ =0</var>
            <var>$child_parent$ = ( )</var>
        </initialise>
        <diag>
            <symptom>
                <name>sh_test2</name>
                <type>collection</collection>
            </symptom>
            <evaluation>
                <name>en_1 <name>
                <evaluate>
                    <name>check_parent</name>
                    <criteria>$sub$ eq $header$</criteria>
                    <operation>$$push($child_parent$, $sub$)</operation>
                    <operation>$count_cp$ = $$count($child_parent$)<
                    /operation>
                    <return>true</return>
                    <result level="2">header $header$ has a duplicate
                    child/result>
                    <result level="2">child_parent has $count_cp$ elements<
                    /result>
                    <recommendation level="4">Fix the thing.
                    </recommendation>
                    <level>4</level>
                </evaluate>
                <evaluate>
                    <name>check_break</name>
                    <criteria>$$count($loop2$) gt4</criteria>
                    <operation>$$break( )</operation>
                    <result>Breaking</result>
                </evaluate>
                <evaluate>
                    <name>check_independant</name>
                    <criteria>$sub$ eq $loop2$</criteria>
                    <category>IOS</category>
                    <return>true</return>
                    <result level="2">sub and loop2 both contain $sub$<
                    /result>
                </evaluate>
                <evaluate>
                    <name>print_pre_merge</name>
                    <criteria>$loop2$ eq $header$ </criteria>
                    <return>true</return>
                    <result level="2">Before: overlap of $loop2$</result>
                </evaluate>
                <evaluate>
                    <name>copy_list_into_scalar</name>
                    <operation>$m_loop$ = $loop2$</operation>
                    <result>Copying list value '$loop2$'into scalar</result>
                </evaluate>
                <evaluate>
                    <name>chk_copy list into_scalar</name>
                    <result>Final value of scalar '$m_loop$'</result>
                </evaluate>
                <evaluate>
                    <name>copy_1 </name>
                    <operation>$$push($m_loop2$, $loop2$)</operation>
                </evaluate>
                <evaluate>
                    <name>copy_2</name>
                    <operation>$$push($m_header$, $header$)</operation>
                </evaluate>
                <evaluate>
                    <name>do_merge</name>
                    <operation>$$merge($m_loop2$, $m_header$)<
```

```
        /operation>
    </evaluate>
    <evaluate>
        <name>print_post_merge</name>
        <criteria>$m_loop2$ eq $m_header$ </criteria>
        <return>true</return>
        <result level="2">After Merge: overlap of
        $m_loop2$</result>
    </evaluate>
    <evaluate>
        <name>print_child_parent</name>
        <criteria>$$count($child_parent$) gt 0</criteria>
        <return>true</return>
        <result level="2 ">child-parent match of $child_parent$
        </result>
    </evaluate>
    <evaluate>
        <name>check_chr</name>
        <operation>$trm$=$$chr(69)</operation>
        <result>'$trm$' should print 'E'<result>
    </evaluate>
    <evaluate>
        <name>check_length<name>
        <operation>$trm$=$$length("hello, world!")</operation>
        <result>$trm$ should print 13<result>
    </evaluate>
    <evaluate>
        <name>check_count_substring</name>
        <operation>$trm$=$$countSubstring(
        "this is as good as it gets","is")</operation>
        <result>$trm$ should print 2</result>
    </evaluate>
    <evaluate>
        <name>check_substring</name>
        <criteria>($$superstring($header$,"3")</criteria>
        <return>true</return>
        <result>header $header$ has a 3 in it</result>
    </evaluate>
    <evaluate>
        <name>check_substring_else<name>
        <criteria>not($$superstring($header$,"3"))</criteria>
        <result>header $header$ does not have a 3 in it</result>
    </evaluate>
    <evaluate>
        <name>check_isValidI_NOT_ok</name>
        <criteria>$$isValidIP("255.255.12.256")</criteria>
        <return>true</return>
        <result>isValidIP is NOT working</result>
    </evaluate>
    <evaluate>
        <name>check_isValidIP_ok</name>
        <criteria>$$isValidIP("255.255.12.100")</criteria>
        <return>true</return>
        <result>isValidIP is working</result>
    </evaluate>
    <evaluate>
        <name>check_getWords</name>
        <operation>$wds$=$$getWords("this is a sentence"̂"
        from two sources")<
        /operation>
        <level>4</level>
    </evaluate>
    <evaluate>
        <name>count_words</name>
        <operation>$c_wds$=$$count($$getWords(
        "this is a sentence"̂ "from two
sources"))</operation>
        <result>Number of words=$c_wds$</result>
        <level>4</level>
    </evaluate>
    <evaluate>
        <name>print_words</name>
        <result>individual word: '$wds$'</result>
        <level>4</level>
    </evaluate>
    <evaluate>
        <name>check_trim</name>
        <operation>$trm$=$$trim(" some info ")</operation>
    </evaluate>
    <evaluate>
        <name>print_trimed_string</name>
        <result>trim='$trm$'should equal 'some info'</result>
    </evaluate>
    <evaluate>
        <name>bit_check</name>
        <operation>$trm$ = $$bitRightShift(8,1)</operation>
    </evaluate>
    <evaluate>
        <name>bit_check_print</name>
        <result>$trm$ should equal 4</result>
    </evaluate>
    <evaluate>
        <name>xor_check</name>
        <operation>$bitop$ = $$bitXor("/8", "/32 ")</operation>
        <result>$bitop$ should equal 0.255.255.25 5</result>
    </evaluate>
    <evaluate>
        <name>or_check</name>
        <operation>$bitop$ = $$bitOr("/8", "0.0.255.255")<
        /operation>
        <result>$bitop$ should equal 255.0.255.255/result>
    </evaluate>
    <evaluate>
        <name>and_check</name>
        <operation>$bitop$ = $$bitAnd("0.255.255.255",
        "/16")/operation>
        <result>$bitop$ should equal 0.255.0.0</result>
    </evaluate>
    <evaluate>
        <name>right_shift_check</name>
        <operation>$bitop$ = $$bitRightShift(256 * 5 , 8)<
        /operation>
        <result>$bitop$ should equal 5</result>
    </evaluate>
    <evaluate>
        <name>right_shift_check</name>
        <operation>$bitop$ = $$bitRightShift("10.86.3.27", 8)
        </operation>
        <result>$bitop$ should equal 0.10.86.3/result>
    </evaluate>
    <evaluate>
        <name>left_shift_check</name>
        <operation>$bitop$ = $$bitLeftShift("/24", 8)</operation>
        <result>$bitop$ should equal 255.255.0.0</result>
    </evaluate>
    <evaluate>
        <name>suppress_me</name>
        <result>This should have been suppressed</result>
    </evaluate>
    <evaluate>
        <name>check_suppress</name>
        <criteria>1/criteria>
        <suppress>
            <name>suppress_me</name>
        </suppress>
        <result>firing supression</result>
    </evaluate>
    </evaluation>
   </diag>
  </diagnosis>
</rbml>
```

Rule 2A, 2B and 2C Show the Usage of Hierarchical Rules:

Rule-2A

```
<rbml>
  <diagnosis>
    <name>test9</name>
    <active>true</active>
    <profile>
        <technology name>IOS</technology name>
        <scope>Node</scope>
    </profile>
```

-continued

```
    <summary>
        <author>Suresh Thiru sthiruka@cisco.com</author>
        <creation_date>Jul 25 2002</creation_date>
        <age>12 months</age>
        <apply>Diagnosis</apply>
        <description>Apply diagnosis to show port channel</description>
    </summary>
    <diag>
        <diagnose>
            <name>test9a</name>
        </diagnose>
        <diagnose>
            <name>test9b</name>
            <include>
                <name>en9_B:et9_B_1</name>
            </include>
        </diagnose>
        <evaluation>
            <name>en9_1</name>
            <key>$sh_test9a:interface$</key>
            <evaluate>
                <name>et9_1_0</name>
                <criteria$sh_test9b:ip_input$ ge 75 and $sh_test9a:
                no_ip_route_cache$</criteria>
                <result>Enable fast switching on interace $sh_test9a:interface
                $</result>
                <result>Parent Rule: $sh_test9a: interface$ and $test9b:dummy
                $</result>
            </evaluate>
        </evaluation>
    </diag>
</diagnosis>
</rbml>
```

Rule-2B

```
<rbml>
    <diagnosis>
        <name>test9a</name>
        <active>true</active>
        <profile>
            <technology_name>IOS</technology_name>
            <scope>Node</scope>
        </profile>
        <summary>
            <author>Suresh Thiru sthiruka@cisco.com</author>
            <creation_date>Jul 25 2002/creation_date>
            <age>12 months</age>
            <apply>Diagnosis</apply>
            <description>Apply diagnosis to show port channel</description>
        </summary>
        <initialise>
            <var> $cnt9a$ = 0/var>
        </initialise>
        <diag>
            <symptom>
                <name>sh_test9a</name>
                <type>collection</type>
            </symptom>
            <evaluation>
                <name>en9_A</name>
                <evaluate>
                    <name>et9_A_1</name>
                    <criteria>$$count($interface$) gt 1 </criteria>
                    <operation>$cnt9a$ = $$count($interface$)</operation>
                    <result>Firing Rule test9a no-of-interfaces: $cnt9a$</result>
                </evaluate>
            </evaluation>
        </diag>
    </diagnosis>
</rbml>
```

Rule-2C

```
<rbml>
    <diagnosis>
        <name>test9b</name>
        <active>true</active>
        <profile>
            <technology_name>IOS</technology_name>
            <scope>Node</scope>
        </profile>
        <summary>
            <author>Suresh Thiru sthiruka@cisco.com</author>
            <creation_date>Jul 25 2002</creation_date>
            <age>12 months</age>
            <apply>Diagnosis</apply>
            <description>Apply diagnosis to show port channel<
            /description>
        </summary>
        <initialise>
            <var> $dummy$ = 375</var>
        </initialise>
        <diag>
    <symptom>
        <name>sh_test9b</name>
        <type>collection</type>
    </symptom>
    <evaluation>
        <name>et9_B</name>
        <evaluate>
            <name>et9_B_1</name>
            <criteria>$ip_input$ ge 70</criteria>
            <result>Firing Rule test9b_1 CPU ($ip_input$) is over 70<
            /result>
        </evaluate>
        <evaluate>
            <name>et9_B_2</name>
            <criteria>1</criteria>
            <result>Firing Rule test9b_2 dummy=$dummy$<result>
        </evaluate>
    </evaluation>
        </diag>
    </diagnosis>
</rbml>
```

Sample Data For Rule 2A:

```
<request>
    <application>Output Interpreter</application>
    <category>BGP</category>
    <category>IOS</category>
    <verbosity>10</verbosity>
    <data>
        <command>sh test9a</command>
        <dataset>
            <!-- show config variables -->
            <interface>e3/1</interface>
            <no_ip_route_cache>0</no_ip_route_cache>
            <no_ip_mroute_cache>1</no_ip_mroute_cache>
        </dataset>
        <dataset>
            <!-- show config variables -->
            <interface>e3/2</interface>
            <no_ip_route_cache>1</no_ip_route_cache>
            <no_ip_mroute_cache>1</no_ip_mroute_cache>
        </dataset>
        <dataset>
            <!-- show config variables -->
            <interface>e3/3</interface>
            <no_ip_route_cache>1</no_ip_route_cache>
            <no_ip_mroute_cache>0</no_ip_mroute_cache>
        </dataset>
```

```
        </data>
        <data>
            <command>sh test9b</command>
            <dataset>
                <!-- show proc cpu variables -->
                <ip_input>80</ip_input>
            </dataset>
```

```
        </data>
    </request>
```

Rule-3:

This shows the usage of the <key> feature in nested datasets like in show_ip_ospf_database_router.

```
<rbml>
    <diagnosis>
        <name>sh_ospf_1</name>
        <active>true</active>
        <profile>
            <technology_name>IOS</technology_name>
            <scope>Node</scope>
        </profile>
        <summary>
            <author>Suresh Thiru sthiruka@cisco.com</author>
            <creation_date>30 Jul 2002</creation_date>
            <age>12 months</age>
            <apply>Diagnosis</apply>
            <description>Apply diagnosis to show ip ospf database routers</description>
        </summary>
            <!-- Predeclare ALL global variables here -->
            <initialise>
                <var>$num_ospf_ases$ = 0</var>
                <var>$num_areas_in_proc$ = 0</var>
                <var>$num_routers_in_area$ = 0</var>
                <var>$problems_in_area$ = 0</var>
                <var>$rb_lsa_string$ = ""</var>
                <var>$arnr_lsa_string$ = ""</var>
                <var>$old_lsa_string$ = ""</var>
            </initialise>
            <diag>
                <symptom>
                    <name>sh_ospf</name>
                    <type>collection</type>
                </symptom>
                <evaluation>
                    <name>en_1</name>
                    <!-- Perform the evaluation(s) below for each $ospd_proc_id$ -->
                    <evaluation>
                        <name>en_2</name>
                        <key>$ospf_proc_id$</key>
                        <evaluate>
                            <name>new_as</name>
                            <operation>$num_ospf_ases$ = $num_ospf_ases$ + 1</operation>
                            <operation>$num_areas_in_proc$ = 0</operation>
                            <result level="4">OSPF Process ID: $ospf_proc_id$ (Router ID: $this_router_id$)</result>
                        </evaluate>
                        <!-- Perform the evaluation(s) below for each $area$ -->
                        <evaluation>
                            <name>en_3</name>
                            <key>$area$</key>
                            <evaluate>
                                <name>new_area</name>
                                <operation>$num_areas_in_proc$ = $num_areas_in_proc$ + 1</operation>
                                <operation>$num_routers_in_area$ = 0</operation>
                                <operation>$problems_in_area$ = 0</operation>
                                <operation>$rb_lsa_string$ = ""</operation>
                                <operation>$arnr_lsa_string$ = ""</operation>
                                <operation>$old_lsa_string$ = ""</operation>
                            </evaluate>
                            <!-- Perform the evaluation(s) below for each $ls_id$ -->
                            <evaluation>
                                <name>en_4</name>
                                <key>$ls_id$</key>
                                <evaluate>
                                    <name>valid_ls_id</name>
                                    <criteria>$ls_id$ ne NULL</criteria>
                                    <operation>$num_routers_in_area$ = $num_routers_in_area$ +1</operation>
                                    <return>true</return>
                                    <level>4</level>
```

-continued

```
                </evaluate>
                    <evaluate>
                        <name>rb_lsa_string_flag</name>
                        <criteria>$valid_ls_id$ and ( $rest$ eq NULL and $advertising_router_id$ ne $this_router id$ )</criteria>
                        <operation>$rb_lsa_string$ = $rb_lsa_string$^"\t "^$ls_id$^"\n"</operation>
                        <operation>$problems_in_area$ = 1</operation>
                        <return>true</return>
                        <level>4</level>
                    </evaluate>
                    <evaluate>
                        <name>arnr_lsa_string_flag</name>
                        <criteria>$valid_ls_id$ and $rest2$ ne NULL</criteria>
                        <operation>$arnr_lsa_string$ = $arnr_lsa_string$^"\t "^$advertising_router_id$^"\n"</operation>
                        <operation>$problems_in_area$ = 1</operation>
                        <return>true</return>
                        <level>4</level>
                    </evaluate>
                    <evaluate>
                        <name>old_lsa_string_flag</name>
                        <criteria>$valid_is_id$ and ($ls_age$ ne NULL and $ls_age$ ne "DNA" and $ls_age$ gt 1800)</criteria>
                        <operation>$old_lsa_string$ = $old_lsa_string$^"\t "^$ls_id$^"\n"</operation>
                        <operation>$problems_in_area$ = 1</operation>
                        <return>true</return>
                        <level>4</level>
                    </evaluate>
                </evaluation><!-- End of foreach $ls_id$ -->
                <evaluate>
                    <name>print_area_header</name>
                    <criteria>$num_routers_in_area$ gt 0</criteria>
                    <return>true</return>
                    <result level="4">Area $area$ is composed of $num_routers_in_area$ router(s).</result>
                </evaluate>
                <evaluate>
                    <name>one_router_in_area</name>
                    <criteria>$num_routers_in_area$ eq 1</criteria>
                    <return>true</return>
                    <recommendation level="4">
                        WARNING: There is only one entry in the link state database for Area $area$.
                    </recommendation>
                    <level>4</level>
                </evaluate>
                <evaluate>
                    <name>bad_link_state</name>
                    <criteria>$rb_lsa_string$ ne ""</criteria>
                    <return>true</return>
                    <result level="4">WARNING: Routing manager has not attempted to install Link State\n
Advertisements (LSAs) in Area $area$ with the following IDs into the\n routing table.\n
$rb_lsa_string$
</result>
                    <level>4</level>
                </evaluate>
                <evaluate>
                    <name>unreachable_routes</name>
                    <criteria>$arnr_lsa_string$ ne ""</criteria>
                    <return>true</return>
                    <result level="4">
WARNING: Advertising routers in Area $area$ with the following IDs
are not communicating properly within OSPF. This is usually the result
of a misconfiguration or a broken topology.
$arnr_lsa_string$
                    </result>
                    <level>4</level>
                </evaluate>
                <evaluate>
                    <name>old_link_state</name>
                    <criteria>$old_lsa_string$ ne ""</criteria>
                    <return>true</return>
                    <result level="4">WARNING: Link State Advertisements (LSAs) with the following
IDs in Area $area$\n are older than 30 minutes (the default refresh period). This means that this\n router has missed at least one LSA flooding.\n
$old_lsa_string$
                    </result>
                    <level>4</level>
                </evaluate>
```

-continued

```
            <evaluate>
                <name>suresh</name>
                <criteria>$problems_in_area$ eq 0</criteria>
                <return>true</return>
                <result level="4">No significant problems exists in area $area$.</result>
            </evaluate>
        <evaluation><!-- End of foreach $area$ -->
      </evaluation><!-- End of foreach $ospf_proc_id$ -->
      <evaluate>
        <name>execessive_ospf_ases</name>
        <criteria>$num_ospf_ases$ gt 1</criteria>
        <return>true</return>
        <result level="4">INFO: This router maintains more than one OSPF process (AS). This
is usually\n unnecessary and places a resource burden on the router.\n</result>
      </evaluate>
    </evaluation>
  </diag>
 </diagnosis>
</rbml>
```

What is claimed is:

1. A method for defining a Rule-Based Markup Language ("RBML") to describe a set of rules for managing a first network among a plurality of networks, the method comprising the computer-implemented steps of:

creating one or more RBML documents for storing the set of rules, wherein the one or more RBML documents include one or more tags defining one or more rule elements, and wherein:

a RBML document storing a symptom-event rule from the set of rules includes:

an event tag identifying a particular event occurring on the network; and a symptom tag identifying a symptom as a generalized abstraction of the particular event; and a RBML document storing a problem-diagnosis rule from the set of rules includes:

a problem-definition tag describing a problem; and a correlation tag identifying a correlation between one or more symptoms, wherein the one or more symptoms are defined in one or more symptom tags that include one or more pre-defined indicators associated with the one or more symptoms; and wherein each of the RBML documents comprises a profile block, event block, summary block, corrective action block, and match block, wherein the profile block identifies network profile elements to which a rule applies, wherein an event block defines which events published by a target device may constitute a recognized symptom, wherein the summary block comprises metadata defining what services or systems are entitled to use or execute a rule; wherein the corrective action block defines one or more actions that can and should be taken to correct a problem that has been determined to exist; wherein the match block comprises one or more match statements that may be applied to raw data to either parse or make a determination about the data;

generating, from information stored in one or more tags of the one or more RBML documents, one or more sequences of instructions, which instructions, when executed by one or more processors, cause the one or more processors to carry out the steps of:

collecting and storing symptom-related data about one or more symptoms, wherein collecting and storing the symptom-related data includes monitoring the network for one or more network events identified in the symptom-event rule; and detecting a problem within the network, wherein detecting the problem includes applying the problem-diagnosis rule to the symptom-related data;

receiving a request from a user to employ a particular rule in managing a second network, separate from the first network; and distributing to a device on the second network the one or more RBML documents storing the particular rule.

2. A method as recited in claim 1, wherein the step of detecting a problem within the network further comprises the steps of:

comparing the symptom-related data to the one or more pre-defined indicators associated with the one or more symptoms to determine whether a particular symptom exists in the symptom-related data;

repeating the step of comparing the symptom-related data for all symptoms identified in the correlation tag of the RBML document storing the problem-diagnosis rule; and only if all symptoms identified in the correlation tag exist, determining that the problem identified in the problem-definition tag is detected.

3. A method as recited in claim 1, wherein the RBML document storing the symptom-event rule further includes:

a profile tag identifying a particular network device; and a command tag identifying a data-collection command, wherein the data-collection command, when executed on the particular network device, returns symptom-related data associated with the particular network device.

4. A method as recited in claim 1, wherein:

the step of creating one or more RBML documents further includes creating a RBML document for storing a problem-correction rule defining one or more corrective actions capable of correcting the problem within the network; and the step of generating instructions includes generating one or more sequences of instructions, which instructions, when executed by the one or more processors, cause the one or more processors to carry out the step of recommending to a user the one or more corrective actions defined in the RBML document storing the problem-correction rule.

5. A computer-readable storage medium carrying one or more sequences of instructions for defining a Rule-Based Markup Language ("RBML") to describe a set of rules for managing a first network among a plurality of networks, which instructions, when executed by one or more processors, cause the one or more processors to carry out the steps of:

creating one or more RBML documents for storing the set of rules, wherein the one or more RBML documents include one or more tags defining one or more rule elements, and wherein:
- a RBML document storing a symptom-event rule from the set of rules includes:
  - an event tag identifying a particular event occurring on the network; and
  - a symptom tag identifying a symptom as a generalized abstraction of the particular event; and
- a RBML document storing a problem-diagnosis rule from the set of rules includes:
  - a problem-definition tag describing a problem; and
  - a correlation tag identifying a correlation between one or more symptoms, wherein the one or more symptoms are defined in one or more symptom tags that include one or more pre-defined indicators associated with the one or more symptoms; and wherein each of the RBML documents comprises a profile block, event block, summary block, corrective action block, and match block, wherein the profile block identifies network profile elements to which a rule applies, wherein an event block defines which events published by a target device may constitute a recognized symptom, wherein the summary block comprises metadata defining what services or systems are entitled to use or execute a rule; wherein the corrective action block defines one or more actions that can and should be taken to correct a problem that has been determined to exist; wherein the match block comprises one or more match statements that may be applied to raw data to either parse or make a determination about the data;

generating, from information stored in one or more tags of the one or more RBML documents, one or more sequences of instructions, which instructions, when executed by one or more processors, cause the one or more processors to carry out the steps of:
- collecting and storing symptom-related data about one or more symptoms, wherein collecting and storing the symptom-related data includes monitoring the network for one or more network events identified in the symptom-event rule; and
- detecting a problem within the network, wherein detecting the problem includes applying the problem-diagnosis rule to the symptom-related data;
- receiving a request from a user to employ a particular rule in managing a second network, separate from the first network; and
- distributing to a device on the second network the one or more RBML documents storing the particular rule.

6. A computer-readable storage medium as recited in claim 5, wherein the instructions for detecting a problem within the network further comprise instructions for carrying out the steps of:

comparing the symptom-related data to the one or more pre-defined indicators associated with the one or more symptoms to determine whether a particular symptom exists in the symptom-related data;

repeating the step of comparing the symptom-related data for all symptoms identified in the correlation tag of the RBML document storing the problem-diagnosis rule; and only if all symptoms identified in the correlation tag exist, determining that the problem identified in the problem-definition tag is detected.

7. A computer-readable storage medium as recited in claim 5, wherein the RBML document storing the symptom-event rule further includes:

a profile tag identifying a particular network device; and a command tag identifying a data-collection command, wherein the data-collection command, when executed on the particular network device, returns symptom-related data associated with the particular network device.

8. A computer-readable storage medium as recited in claim 5, wherein:

the instructions for creating one or more RBML documents further comprise instructions for carrying out the step of creating a RBML document for storing a problem-correction rule defining one or more corrective actions capable of correcting the problem within the network; and the instructions for generating one or more sequences of instructions, by using information stored in one or more tags of one or more RBML documents, further comprise instructions for carrying out the step of recommending to a user the one or more corrective actions defined in the RBML document storing the problem-correction rule.

\* \* \* \* \*

UNITED STATES PATENT AND TRADEMARK OFFICE
CERTIFICATE OF CORRECTION

PATENT NO.       : 7,668,953 B1                                    Page 1 of 1
APPLICATION NO.  : 10/714158
DATED            : February 23, 2010
INVENTOR(S)      : Sinclair et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1735 days.

Signed and Sealed this

Twenty-eighth Day of December, 2010

David J. Kappos
*Director of the United States Patent and Trademark Office*